US012744781B2

(12) United States Patent
Mee et al.

(10) Patent No.: US 12,744,781 B2
(45) Date of Patent: Sep. 22, 2026

(54) METHOD AND SYSTEM FOR PERMISSION MANAGEMENT

(71) Applicant: nChain Licensing AG, Zug (CH)

(72) Inventors: Andrew James Mee, Cardiff (GB); Ricky Charles Rand, Glasgow (GB); Paul Clark, Glasgow (GB)

(73) Assignee: nChain Licensing AG, Zug (CH)

( * ) Notice: Subject to any disclaimer, the term of this patent is extended or adjusted under 35 U.S.C. 154(b) by 6 days.

(21) Appl. No.: 18/716,454

(22) PCT Filed: Jan. 31, 2023

(86) PCT No.: PCT/EP2023/052358
§ 371 (c)(1),
(2) Date: Jun. 4, 2024

(87) PCT Pub. No.: WO2023/148178
PCT Pub. Date: Aug. 10, 2023

(65) Prior Publication Data

US 2025/0284784 A1 Sep. 11, 2025

(30) Foreign Application Priority Data

Feb. 1, 2022 (GB) ...................................... 2201289
Feb. 1, 2022 (GB) ...................................... 2201290
(Continued)

(51) Int. Cl.
*H04L 9/40* (2022.01)
*G06F 21/60* (2013.01)

(52) U.S. Cl.
CPC ............ *H04L 63/10* (2013.01); *G06F 21/604* (2013.01); *H04L 63/105* (2013.01); *G06F 2221/2145* (2013.01)

(58) Field of Classification Search
CPC .................. G06F 21/604; G06F 21/62; G06F 21/6218–6281; G06F 21/64;
(Continued)

(56) References Cited

U.S. PATENT DOCUMENTS 10,560,457 B2 * 2/2020 Anderson ............. H04L 63/102
2007/0016532 A1 * 1/2007 Zhang ................. G06F 21/1083 705/59
2008/0010458 A1 * 1/2008 Holtzman ........... H04L 63/0823 713/189

FOREIGN PATENT DOCUMENTS

WO 2021/165814 A2 8/2021
WO 2021/165816 A1 8/2021
WO 2021/165848 A1 8/2021

OTHER PUBLICATIONS

International Search Report and Written Opinion mailed Apr. 21, 2023, issued in International Patent Application No. PCT/EP2023/052358, filed Jan. 31, 2023, 13 pages.
(Continued)

*Primary Examiner* — Kevin Bechtel
(74) *Attorney, Agent, or Firm* — Renner Otto Boisselle Sklar LLP; Christopher P. Harris

(57) ABSTRACT

The present disclosure proposes methods, devices and systems for validating a permit. The method of the first aspect comprises the steps of receiving a request comprising a first permit identifier, wherein the first permit identifier identifies a first permit, and obtaining a first permit data based on the first permit identifier wherein the first permit data comprises data indicative of at least one permission and wherein the at least one permission provides an indication of one or more actions a holder of the first permit can take and/or what the holder of the first permit is allowed to do, wherein the request is a request to validate an expression associated with
(Continued)

at least one permission of the first permit and the request comprises data indicative of the expression.

17 Claims, 5 Drawing Sheets

(30) Foreign Application Priority Data

Feb. 1, 2022 (GB) ..................................... 2201291
Feb. 1, 2022 (GB) ..................................... 2201292

(58) Field of Classification Search
CPC ..... G06F 2221/2141; G06F 2221/2145; H04L 63/10–108; H04L 63/20
See application file for complete search history.

(56) References Cited

OTHER PUBLICATIONS

International Search Report and Written Opinion mailed Apr. 21, 2023, issued in International Patent Application No. PCT/EP2023/052354, filed Jan. 31, 2023, 14 pages.
International Search Report and Written Opinion mailed Apr. 21, 2023, issued in International Patent Application No. PCT/EP2023/052356, filed Jan. 31, 2023, 13 pages.
International Search Report and Written Opinion mailed Apr. 24, 2023, issued in International Patent Application No. PCT/EP2023/052351, filed Jan. 31, 2023, 14 pages.
Pornin, T., "Deterministic Usage of the Digital Signature Algorithm (DSA) and Elliptic Curve Digital Signature Algorithm (ECDSA)," Request for Comments: 6979, Informational, Aug. 2013, 79 pages.

* cited by examiner 100
108
102
104
114
106
110
112

200
202
nChain
top-level root
creates
204
nChain
working root A
nChain
working root B
nChain
working root C
204
204
206
Org ABC
root
Org PQR
root
208
Org XYZ
root
210
212
ABC customer
13645
214
ABC customer
13783
216
XYZ Country
UK
218
220
XYZ member
UK094432
XYZ member
UK095391

302
300
NBW Root
304
306
Angling Permit
Fred Bass
Angling Permit
Sally Pike 302
320
NBW Root
304
306
322
Angling Permit
Fred Bass
Angling Permit
Sally Pike
Club Permit
BLFC
324
326
Angling Permit
Joe Lake
Angling Permit
Jenny Lake

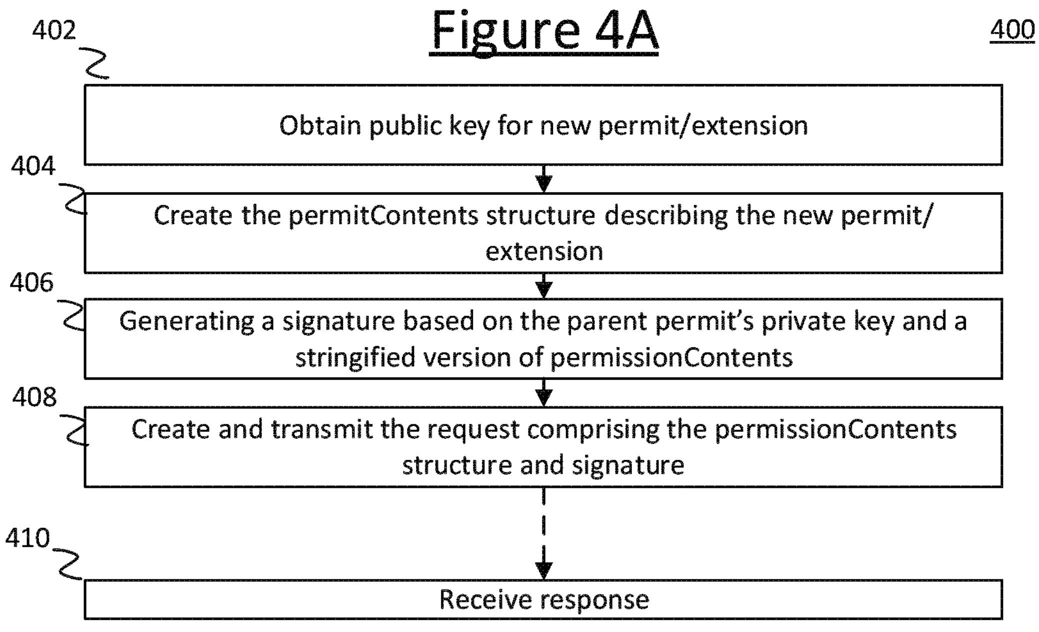
Figure 4A
400
402
Obtain public key for new permit/extension
404
Create the permitContents structure describing the new permit/ extension
406
Generating a signature based on the parent permit's private key and a stringified version of permissionContents
408
Create and transmit the request comprising the permissionContents structure and signature
410
Receive response

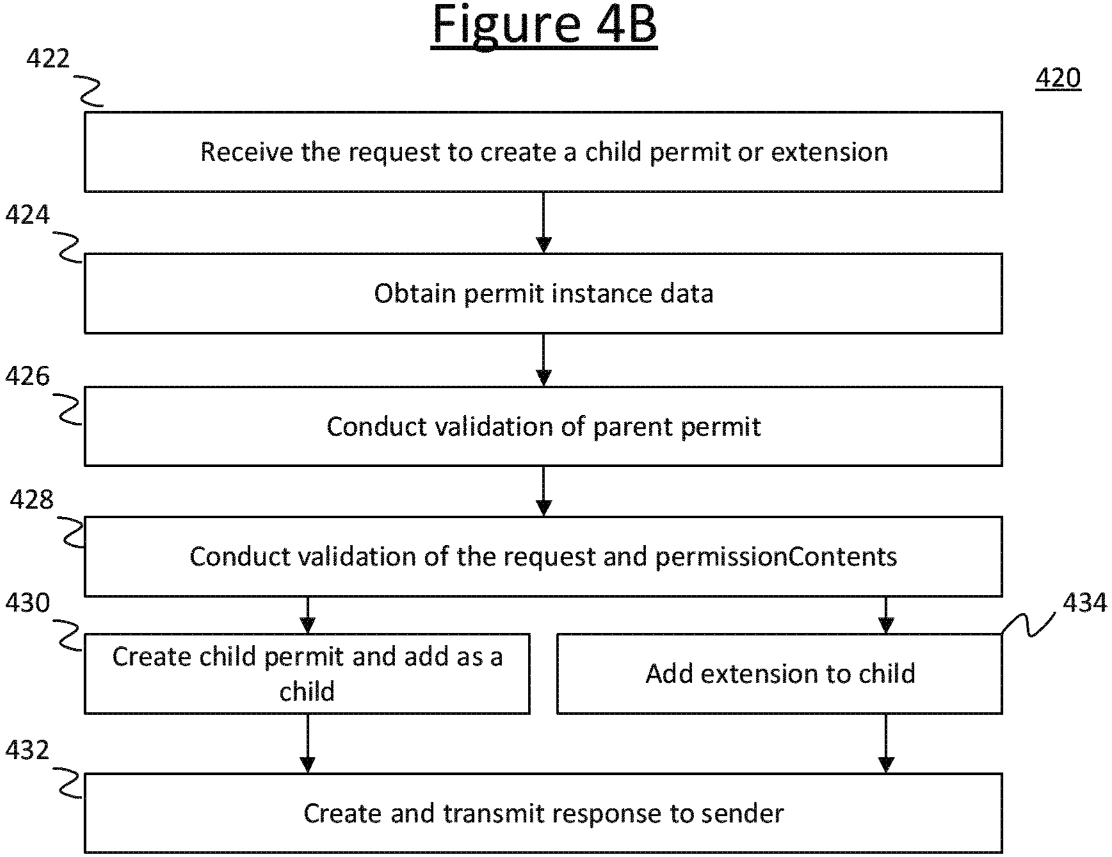
Figure 4B
420
422
Receive the request to create a child permit or extension
424
Obtain permit instance data
426
Conduct validation of parent permit
428
Conduct validation of the request and permissionContents
430
Create child permit and add as a child
434
Add extension to child
432
Create and transmit response to sender

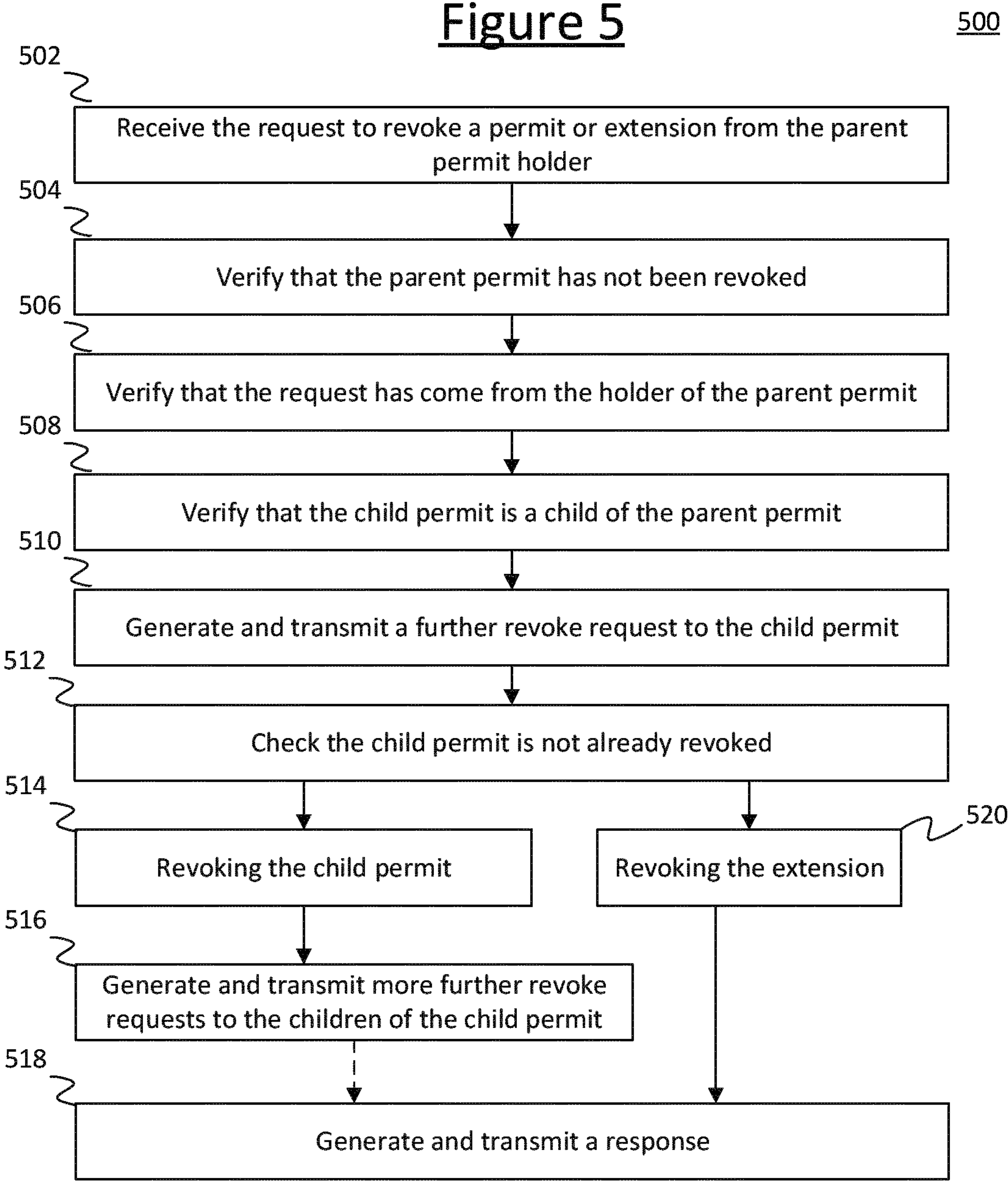
Figure 5
500
502
Receive the request to revoke a permit or extension from the parent permit holder
504
Verify that the parent permit has not been revoked
506
Verify that the request has come from the holder of the parent permit
508
Verify that the child permit is a child of the parent permit
510
Generate and transmit a further revoke request to the child permit
512
Check the child permit is not already revoked
514
Revoking the child permit
520
Revoking the extension
516
Generate and transmit more further revoke requests to the children of the child permit
518
Generate and transmit a response

METHOD AND SYSTEM FOR PERMISSION MANAGEMENT

CROSS-REFERENCE TO RELATED APPLICATION

This application is a 371 National Stage Patent Application of International Patent Application No. PCT/EP2023/052358, filed on Jan. 31, 2023, which claims priority to United Kingdom Patent Application No. 2201289.2, filed Feb. 1, 2022, United Kingdom Patent Application No. 2201290.0, filed Feb. 1, 2022, United Kingdom Patent Application No. 2201291.82, filed Feb. 1, 2022, and United Kingdom Patent Application No. 2201292.6, filed Feb. 1, 2022, the disclosures of which are incorporated herein by reference in their entirety.

FIELD

The present disclosure relates to the provision of a permit and permissions system. More particularly, the present disclosure provides flexible permits allowing for pseudo-anonymous association of identity with a permit; flexible permission definition, revocation, and addition; and increased security.

BACKGROUND

A permit is something you have, often carry with you, which allows you to do something. Permits can be for a range of different things with varying levels of permissibility associated with them. For example, a person might have a driver's license which signifies they have permission to drive. Different driver's licenses may also comprise different limitations. Provisional driver's licenses for example may allow you to drive only during certain times, only certain types of vehicles, or only with another fully permissioned driver. Other licenses could include fishing licenses which allows one to fish however can also impart restrictions on the type, size, and/or count of fish catchable over a time period.

It can be seen that permits preferably comprise two components: a permission (optionally with an additional limitation associated with it) and a person that's allowed to do what's in the permission.

Permits can require a great deal of trust between a holder and a verifier. In particular, a verifier must trust that the physical holder of the permit is who they say they are, that the permit is not forged in any way and originates from a trusted source, and that what the permit allows the holder to do is correct.

Thus, there is a need for an improved, versatile, and/or secure permit system or at least provide a useful alternative.

SUMMARY OF THE INVENTION

In a first aspect, the present disclosure proposes methods, devices, systems, and computer programs for validating a permit. In more detail, the method of the first aspect comprises the steps of receiving a request comprising a first permit identifier, wherein the first permit identifier identifies a first permit, and obtaining a first permit data based on the first permit identifier wherein the first permit data comprises data indicative of at least one permission and wherein the at least one permission provides an indication of one or more actions a holder of the first permit can take and/or what the holder of the first permit is allowed to do, wherein the request is a request to validate an expression associated with at least one permission of the first permit and the request comprises data indicative of the expression.

Some specific components and embodiments of the disclosed method are now described by way of illustration with reference to the accompanying drawings, in which like reference numerals refer to like features.

BRIEF DESCRIPTION OF THE FIGURES

FIGS. 4A and 4B depict example methods for generation of a new permit and/or additional extension.

FIG. 5 depicts an example method for revoking a permit and/or extension of a permit.

DETAILED DESCRIPTION

Figures 1, 2:
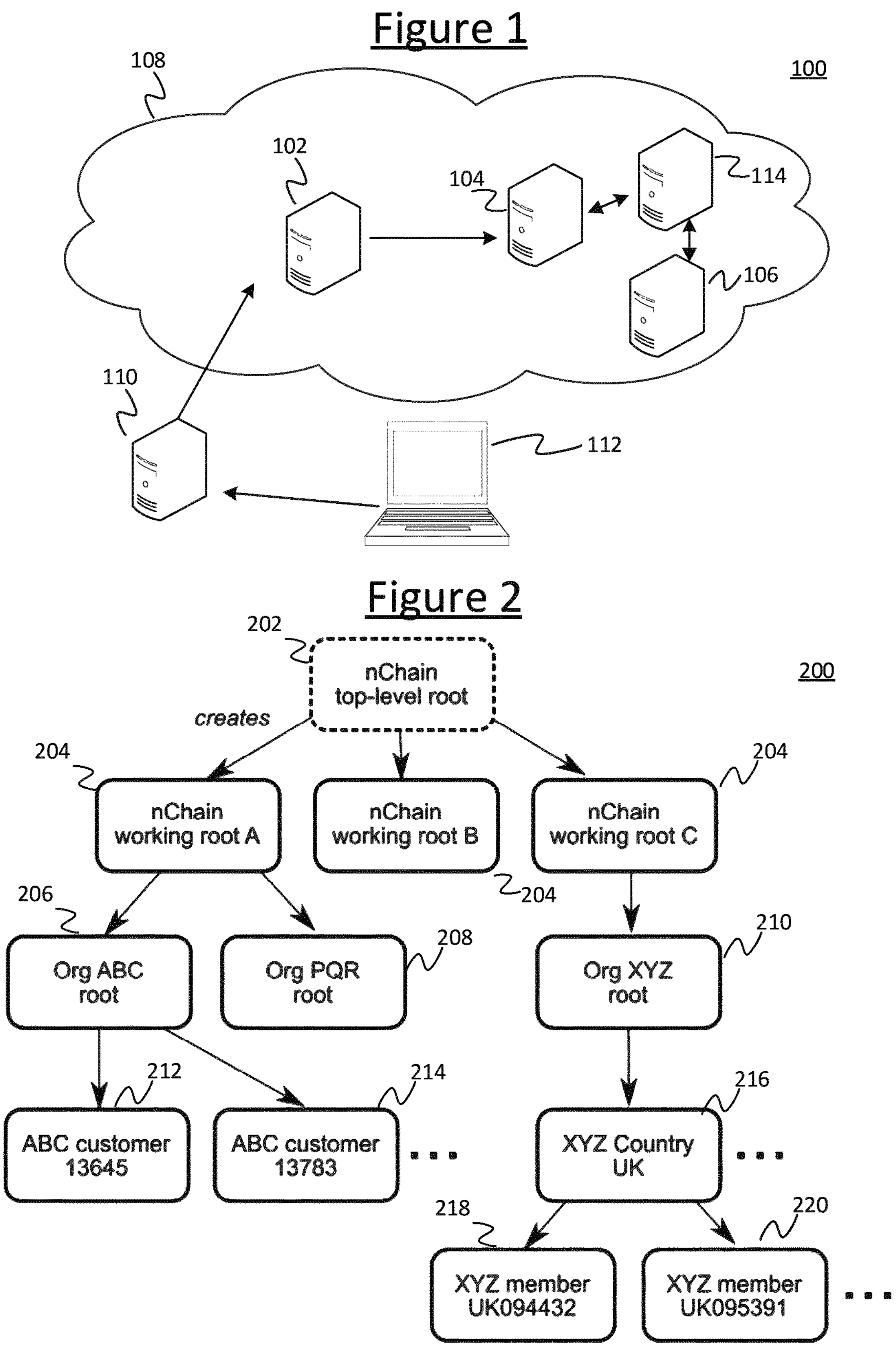
FIG. 1 depicts an example secure processing environment and some devices configured to interact with it.
FIGS. 2, 3A, and 3B depict example hierarchical permit structures.

There is provided herein methods, devices, systems, and computer programs for creating, revoking, extending, validating, or otherwise interacting with permits comprising permissions. Permits preferably provide both identification information (or information that can be used in the process of identifying a holder of a permit) and a description of what the holder is allowed to do and/or the actions they can take. More preferably, interactions with permits and/or children of permits are conducted through requests.

In a first aspect, the present disclosure proposes methods, devices, systems, and computer programs for validating a permit. In more detail, the method of the first aspect comprises the steps of receiving a request comprising a first permit identifier, wherein the first permit identifier identifies a first permit, and obtaining a first permit data based on the first permit identifier wherein the first permit data comprises data indicative of at least one permission and wherein the at least one permission provides an indication of one or more actions a holder of the first permit can take and/or what the holder of the first permit is allowed to do, wherein the request is a request to validate an expression associated with at least one permission of the first permit and the request comprises data indicative of the expression.

Advantageously, receiving and processing requests at a process associated with the permit enables third parties to interact with and validate permits allows for secure and programmatic validation of user's permissions. Further advantages are provided below next to each optional embodiment as well as throughout the specification as each embodiment is described.

In an embodiment, the method further comprises the step of determining whether the permit comprises a permission that matches the data indicative of the further permission. Preferably the method further comprises the step of returning a result of the determination of a matching permission to the sender. Advantageously, allowing third parties wishing to validate different permissions of the permit to refer to specific permissions allows for greater flexibility in the permit construction as well as greater flexibility in how the permissions are interacted with.

In an embodiment, the method further comprises the step of continuing processing the request based on a determination of whether the first permit has been revoked. Advantageously, revocation enables the remaining permission checks to be skipped (as they are all considered invalid) thereby increasing processing efficiency.

In an embodiment, the step of determining whether the first permit has been revoked comprises checking a revoked field in the first permit data. Advantageously, efficiencies are gained by storing the revoked field on the permit data itself as it enables the permit itself to report whether it has been revoked and not rely on any further resources (such as revoked lists) or third parties which may not be trustworthy and/or would require extra resources to interact with and store the results of.

In an embodiment, the step of determining whether the first permit has been revoked comprises checking whether a first time stored in the revoked field is earlier than a current time. Through the use of a timestamp in the revoked field, flexibility about when the permit is considered revoked is added into the system thereby also increasing the security as the attack surface of when a permit could be interfered with is also reduced.

In an embodiment, the expression comprises data configured to interrogate features of the permissions associated with the first permit. In an embodiment, the method further comprises the step of evaluating the expression. In an embodiment, the method further comprises the step of returning the result of the evaluation of the expression to the sender of the request. Advantageously, through use of expressions and being able to evaluate them with respect to the permit's permissions, the permit creator and requester have flexibility to adapt and extend how permits are interacted with and the sorts of features they can store in a permit.

In an embodiment, the method further comprises the step of determining whether a subset of permissions are valid. In an embodiment, the method further comprises comparing a current time with a validity range associated with the subset of permissions.

In an embodiment, the request comprises data to identify the subset of permissions. In an embodiment, the step of evaluating the expression comprises identifying or accessing the permission or permissions being interrogated based on the data to identify the subset of permissions.

In an embodiment, the method further comprises receiving a further request to validate a signature signed by a holder of the permit. In an embodiment, the further request comprises the signature and the message the signature was applied to. In an embodiment, the method comprises verifying the signature, wherein the verification of the signature is based on the public key of the first permit, obtained from the first permit data, the signature, and the data. In an embodiment, the result of the verification is provided to the sender of the further request. In an embodiment, the sender of the request and the further request are the same. Advantageously, using cryptographically secure technology to ensure the "who" part of the permit aspects enables the permit to increase the security of the overall method and usage of permits.

In an embodiment, data indicative of the at least one permission is an object comprising at least one name-value pair. In an embodiment, the name of the name-value pair is represented by a string and the value of the name-value pair is represented by a string and/or at least one further name-value pair. In an embodiment, the string is arbitrary and/or user generated. In an embodiment, the value is arbitrary and/or user generated. Advantageously, using name-value pairs and in particular user generated name-value pairs allows for greater flexibility in the design of the security permit system and further enables the namespace features as discussed below.

In an embodiment, the request is received via an API that is only provided to computing modules belonging to a secure computing environment. In an embodiment, a computing module conducting the method of any one or more of the embodiments herein is a part of the secure computing environment. Advantageously, where the requests originate from a secure computing environment, the request can, in many cases, be presumed to be valid. By presuming a request is valid, processing time can be saved as other checks (such as signature validation, authorisation, validation of the request itself, and other checks) may be skipped thereby reducing the processing time and computing resources required to process the request.

In an embodiment, the first permit is part of a hierarchy of permits. In an embodiment, the first permit data comprises data indicative of a parent permit. In an embodiment, the first permit data comprises data indicative of children permits. Advantageously, a hierarchical permit structure enables alternative and improved management of permits. In an embodiment, the hierarchy is such that when a parent permit is revoked, its children are also revoked. Having parents and children preferably provides a hierarchical tree structure. Further advantageously, a hierarchical structure allows for the parent and child relationship thereby enabling the advantages discussed below in relation to namespaces, child creation limitations, and cascading revocations.

In an embodiment, the first permit data comprises at least one namespace, wherein each namespace defines part of a permission a child of the first permit can have. Advantageously, this provides a way to limit what permits can do such that if a child and/or parent permit becomes compromised in any way, the child permit will be limited in what further permissions it is able to receive and/or generate on other permits.

In an embodiment, the first permit data comprises an indication as to whether further permits may be generated that are children of the first permit. In an embodiment, the first permit data comprises an indication as to a maximum depth of descendants that the first permit can have. In an embodiment, the first permit data comprises a maximum number of children permits that the first permit can have. In an embodiment, the first permit data comprises an array to indicate a maximum number of descendant permits that the first permit can have at different depths. Advantageously, limiting the number of children (even to zero), the depth of children, and/or the number of children at different depths a permit can create provides increased security as these limitations allow parent permit holders to limit what a potentially compromised and/or adversarial first permit holder can do.

In an embodiment, the first permit data comprises a time that indicates when the permit is valid from. In an embodiment, the first permit data comprises a time that indicates when the permit is valid until. Advantageously, providing time values for when the permit is valid from or until allows greater flexibility for the parent permit holder to select when the permit can be valid. Further, the security of the system is increased by limiting the time the permit is valid. Limiting the time a permit is valid from/to limits the amount of time an adversarial third party can interfere with the permit.

In an embodiment, the first permit identifier obliviates the identity of the holder of the first permit. In an embodiment, the first permit identifier is a pseudo-randomly generated string of characters. Advantageously, having the permit identifier not identify the user associated with the permit further increases the security as it is much more difficult for an adversarial third party that has access to the identifier to identify, impersonate, approach and/or otherwise interact with/as the associated user.

In an embodiment, the method further comprises the step of transmitting data indicative of the request for storage in a log or for inclusion on a blockchain. Preferably, the data indicative of the request is configured to provide an indication as to the state of the permit. More preferably, a set of data indicative of previous interactions with the permit is configured to provide an indication as to the current state of the permit.

Advantageously, storing all of the interactions with the permit (and in particular any interactions which modify the permit) including the permit's creation, the set of interactions can be used to reconstruct the permit. This reconstruction can be compared with the permit's current status to ensure that nothing about the permit has been tampered with thereby further increasing the security and ability for third parties to rely on the secure status of the permit. The use of a blockchain to record the interactions provides yet more security as the blockchain provides extra security and public, verifiable, non-malleability of the log of interactions.

In more detail, the system of the first aspect comprises a first computing module configured to generate the first request, and a permit computing module configured to conduct any one of the embodiments of the method of the first aspect. In an embodiment, the permit computing module belongs to a secure computing environment. In an embodiment, wherein the first computing module is a further permit computing module and the further permit computing modules belongs to the secure computing environment.

Advantageously, where the devices are all running in the same secure computing environment, this can act as a way to confirm that the requests are originating from a secure source and therefore can be presumed (in many cases) to be valid. By presuming a request is valid, processing time can be saved as other checks (such as signature validation, authorisation, validation of the request itself, and other checks) may be skipped thereby reducing the processing time and computing resources required to process the request.

In an embodiment, the first computing module is a user device. Advantageously thereby allowing other users to interact with permits.

In more detail, the device of the aspect comprises a processor and memory, the memory including executable instructions that, as a result of execution by the processor, causes the device to perform the computer-implemented method according to any one of the embodiments of the method of the first aspect.

According to the first aspect, there is also described a non-transitory computer readable storage medium comprising computer program code instructions, being executable by a computer, to conduct any of the embodiments of the method of the first aspect.

In a second aspect, the present disclosure proposes methods, devices, systems, and computer programs for creating a permit. In more detail, the method comprising the steps of receiving a request comprising a first permit identifier, wherein the first permit identifier identifies a first permit, and obtaining a first permit data based on the first permit identifier wherein the first permit data comprises data indicative of at least one permission and wherein the at least one permission provides an indication of one or more actions a holder of the first permit can take and/or what the holder of the first permit is allowed to do, wherein the request is a request to create a further permit and the request comprises data indicative of a further permit.

Advantageously, the creation of child permits enables a hierarchical structure within the permit system. The hierarchical structure enables efficient revocation methods as discussed below. Further, a secure flexible method of permit creation is provided such that permit holders are able to construct child permits through use of the contents of the request.

In an embodiment, the method further comprises the steps of validating the first permit, creating the further permit based on the data indicative of the further permit, and recording a reference to the further permit on the first permit data such that the further permit is recorded as a child of the first permit. Advantageously, the reference to the child permit is used to further enable to traversal of the hierarchical permit structure and all of the advantages associated with that.

In an embodiment, the step of validating the first permit data comprises determining whether the first permit has been revoked. In an embodiment, the step of determining whether the first permit has been revoked comprises checking a revoked field in the first permit data. Advantageously, revocation enables the remaining checks associated with permit creation to be skipped (as a revoked permit cannot create new child permits) thereby increasing processing efficiency. Further, efficiencies are gained by storing the revoked field on the permit data itself as it enables the permit itself to report whether it has been revoked and not rely on any further resources (such as revoked lists) or third parties which may not be trustworthy and/or would require extra resources to interact with and store the results of.

In an embodiment, the step of determining whether the first permit has been revoked comprises comparing a first time stored in the revoked field with a current time. Preferably, if the first time is in the past as compared with the current time, the first permit is considered revoked. Preferably, if the first permit is considered revoked, the further permit is not created and/or the processing of the request stops. Through the use of a timestamp in the revoked field, flexibility and added security about when the permit is considered revoked is added into the system.

In an embodiment, the method comprises the step of validating that the first permit is able to create child permits. In an embodiment, the step of validating the first permit is able to create child permits comprises any one or more of the following steps: validating that a maximum number of child permits associated with the first permit has not been exceeded, and/or validating that a maximum depth of child permits associated with the first permit has not been exceeded. Storing data indicative of whether the permit is able to create children on the parent permit itself provides computation efficiencies as no separate resources need to be managed or referenced. Further, these methods of limiting child creation result in a flexible but secure system as the creator of the first permit can set child creation limitations which must be adhered to for the life of the first permit.

In an embodiment, the method further comprises the step of verifying the data indicative of the further permit. In an embodiment, the request further comprises a signature and wherein the step of verifying the data indicative of the further permit comprises verifying that the signature is valid and signed using a private key of a first permit holder. Advantageously, cryptographically secure validations of signatures increases the overall security of the system and limits or completely disallows third parties to pretend to be a permit holder.

In an embodiment, the step of verifying the data indicative of the further permit comprises verifying that a validity range of the further permit is within a validity range of the first permit. Preferably, verifying that the validity range of the further permit is within a validity range of the first permit comprises determining that a start point of the validity range of the further permit is the same or later than a start point of the first permit and determining that an end point of the validity range of the further permit is the same or earlier than an end point of the first permit. Advantageously, providing a validity range of the permit increases security by reducing the time a third party, were they to have unauthorised access, could interact with the permit.

In an embodiment, the step of verifying the data indicative of the further permit comprises verifying that a permission or permissions of the further permit are within the scope of permissions that the parent permit is allowed to create. In an embodiment, the permission or permissions of the further permit are comprised in the request. In an embodiment, the step of verifying that any permissions of the further permit are within the scope of permissions that the parent permit is able to create comprises determining the namespace or namespaces that the parent permit is allowed to create, determining the namespace or namespaces of the permission or permissions of the further permit, and determining that the namespace or namespaces of the permission or permissions of the further permit are the same or are prefixed with the namespace or namespaces of that the parent permit is allowed to create. Advantageously, this provides a hierarchical aspect or dimensionality to the permissions thereby also increasing the security as permissions cannot be created that are not within the scope of, for example, an organisation's allowed permissions.

In an embodiment, the step of creating the further permit comprises creating a further permit data instance based on the permit, wherein the further permit data comprises a parent permit value which is set to the first permit identifier.

In an embodiment, the method further comprises the step of providing a further permit identifier to the sender of the request. In an embodiment only the further permit identifier is provided to the sender of the request. Advantageously, the permit identifier is used to interact with the permit pseudo-anonymously in that with only the identifier, the user associated with the permit cannot be identified.

In an embodiment, data indicative of the at least one permission is an object comprising at least one name-value pair. In an embodiment, the name of the name-value pair is represented by a string and the value of the name-value pair is represented by a string and/or at least one further name-value pair. In an embodiment, the string is arbitrary and/or user generated. In an embodiment, the value is arbitrary and/or user generated. Advantageously, using name-value pairs and in particular user generated name-value pairs allows for greater flexibility in the design of the security permit system and further enables the namespace features as discussed below.

In an embodiment, the request is received via an API that is only provided to computing modules belonging to a secure computing environment. In an embodiment, a computing module conducting the method of any one or more of the embodiments herein is a part of the secure computing environment. Advantageously, where the requests originate from a secure computing environment, the request can, in many cases, be presumed to be valid. By presuming a request is valid, processing time can be saved as other checks (such as signature validation, authorisation, validation of the request itself, and other checks) may be skipped thereby reducing the processing time and computing resources required to process the request.

In an embodiment, the first permit is part of a hierarchy of permits. In an embodiment, the first permit data comprises data indicative of a parent permit. In an embodiment, the first permit data comprises data indicative of children permits. Advantageously, a hierarchical permit structure enables alternative and improved management of permits. In an embodiment, the hierarchy is such that when a parent permit is revoked, its children are also revoked. Having parents and children preferably provides a hierarchical tree structure. Further advantageously, a hierarchical structure allows for the parent and child relationship thereby enabling the advantages discussed below in relation to namespaces, child creation limitations, and cascading revocations.

In an embodiment, the first permit data comprises at least one namespace, wherein each namespace defines part of a permission a child of the first permit can have. Advantageously, this provides a way to limit what permits can do such that if a child and/or parent permit becomes compromised in any way, the child permit will be limited in what further permissions it is able to receive and/or generate on other permits.

In an embodiment, the first permit data comprises an indication as to whether further permits may be generated that are children of the first permit. In an embodiment, the first permit data comprises an indication as to a maximum depth of descendants that the first permit can have. In an embodiment, the first permit data comprises a maximum number of children permits that the first permit can have. In an embodiment, the first permit data comprises an array to indicate a maximum number of descendant permits that the first permit can have at different depths. Advantageously, limiting the number of children (even to zero), the depth of children, and/or the number of children at different depths a permit can create provides increased security as these limitations allow parent permit holders to limit what a potentially compromised and/or adversarial first permit holder can do.

In an embodiment, the first permit data comprises a validity range. In an embodiment, the first permit data comprises a time that indicates when the permit is valid from. In an embodiment, the first permit data comprises a time that indicates when the permit is valid until. Advantageously, providing time values for when the permit is valid from or until allows greater flexibility for the parent permit holder to select when the permit can be valid. Further, the security of the system is increased by limiting the time the permit is valid. Limiting the time a permit is valid from/to limits the amount of time an adversarial third party can interfere with the permit.

In an embodiment, the first permit identifier obliviates the identity of the holder of the first permit. In an embodiment, the first permit identifier is a pseudo-randomly generated string of characters. Advantageously, having the permit identifier not identify the user associated with the permit further increases the security as it is much more difficult for an adversarial third party that has access to the identifier to cannot identify, impersonate, approach and/or otherwise interact with/as the associated user.

In an embodiment, the method further comprises the step of transmitting data indicative of the request for storage in a log or for inclusion on a blockchain. Preferably, the data indicative of the request is configured to provide an indication as to the state of the permit. More preferably, a set of data indicative of previous interactions with the permit is configured to provide an indication as to the current state of the permit.

Advantageously, storing all of the interactions with the permit (and in particular any "send" interactions which modify the permit) including the permit's creation, the set of interactions can be used to reconstruct the permit. This reconstruction can be compared with the permit's current status to ensure that nothing about the permit has been tampered with thereby further increasing the security and ability for third parties to rely on the secure status of the permit. The use of a blockchain to record the interactions provides yet more security as the blockchain provides extra security and public, verifiable, non-malleability of the log of interactions.

In more detail, the system of the second aspect comprises a first computing module configured to generate the first request, and a permit computing module configured to conduct any one of the embodiments of the method of the second aspect. In an embodiment, the permit computing module belongs to a secure computing environment. In an embodiment, wherein the first computing module is a further permit computing module and the further permit computing modules belongs to the secure computing environment.

Advantageously, where the devices are all running in the same secure computing environment, this can act as a way to confirm that the requests are originating from a secure source and therefore can be presumed (in many cases) to be valid. By presuming a request is valid, processing time can be saved as other checks (such as signature validation, authorisation, validation of the request itself, and other checks) may be skipped thereby reducing the processing time and computing resources required to process the request.

In an embodiment, the first computing module is a user device. Advantageously thereby allowing other users to interact with permits.

In more detail, the device of the second aspect comprises a processor and memory, the memory including executable instructions that, as a result of execution by the processor, causes the device to perform the computer-implemented method according to any one of the embodiments of the method of the second aspect.

According to the second aspect, there is also described a non-transitory computer readable storage medium comprising computer program code instructions, being executable by a computer, to conduct any of the embodiments of the method of the second aspect.

In a third aspect, the present disclosure proposes methods, devices, systems, and computer programs for revoking at least a permission. In more detail, the method of the third aspect comprises: receiving a request comprising a first permit identifier, wherein the first permit identifier identifies a first permit, and obtaining a first permit data based on the first permit identifier wherein the first permit data comprises data indicative of at least one permission and wherein the at least one permission provides an indication of one or more actions a holder of the first permit can take and/or what the holder of the first permit is allowed to do. Wherein the request is a request to revoke at least a subset of permissions of the first permit data and the method further comprises the step of revoking a subset of permissions.

In an embodiment, the step of revoking a subset of permissions is a step of revoking all of the permissions. In an embodiment, the step of revoking all of the permissions comprises revoking the first permit. Advantageously, if all of the permissions of a permit (and the permit itself) need to be revoked, a computationally efficient method is presented as the no sets of permissions or individual permissions need to be iterated over to have them removed/revoked.

In an embodiment, the request further comprises an indication as to the subset of permissions to be revoked. In an embodiment, the indicator as to the subset of permissions is a string. In an embodiment, the string is user generated. Advantageously, allowing strings to represent groups of permissions provides an efficient method of identifying and in particular revoking them as compared with listing each individual permissions a user wishes to revoke but also provides finer control as compared with revoking an entire permit.

In an embodiment, the step of revoking the subset of permissions of the first permit data comprises setting a value to a revoked field in the first permit data. In an embodiment, the value is a time value. In an embodiment, the time value set in the revoked field is the current time or is a time field in the request. In an embodiment, the first permit and/or the subset of permissions of the first permit is considered to be revoked based on the value in the revoked field. In an embodiment, the first permit and/or the subset of permissions of the first permit is considered revoked based on a comparison of the current time with the time value set in the revoked field. Through the use of a timestamp in the revoked field, flexibility about when the permit is considered revoked is added into the system thereby also increasing the security as the attack surface of when a permit could be interfered with is also reduced.

In an embodiment, the method comprises determining the validity of the request and wherein determining the validity of the request comprises verifying that a sender of the request is a process associated with a parent of the first permit or sent by the holder of the parent of the first permit. In an embodiment, if the sender of the request is not the parent of the first permit or the holder of the parent permit, the request is rejected. In an embodiment, determining that the sender of the request is the process associated with the of the first permit comprises: determining the request was received from a computing module within a secure computing environment. In an embodiment, determining the request was received from a computing module within the secure environment comprises comparing a process identifier comprised in the received request and a further process identifier associated with the first permit. In an embodiment, verifying that the sender of the request is the process associated with a parent of the first permit or sent by the holder of the parent of the first permit comprises validating a cryptographic signature of the request. In an embodiment, validating a cryptographic signature comprises validating that the signature was signed by the holder of the parent permit. Advantageously, through use of cryptographic means, or ensuring that the request has come from a known secure process, the security of the system is increased as invalid requests to revoke the permit or subset of permissions will be rejected.

In an embodiment, determining the validity of the request further comprises, determining if a permit identifier comprised in the request matches a parent permit identifier stored on the first permit data. Advantageously, only allowing parent permits to modify the child permit in this way provides yet even more security.

In an embodiment, the method further comprises revoking all of the first permit's descendants. In an embodiment the step of revoking all of the first permit's descendants comprises obtaining a list of child permits from the first permit data, and transmitting a further revoke request to the child permit process, such that the child permit revokes all of its descendants. In an embodiment, the further revoke request is constructed such, upon reception, that each descendant permit conducts steps of the present aspect recursively until all of the descendants are revoked. Advantageously, this ensures that descendants of the parent permit are also revoked. This increases the overall security of the permit hierarchy and system and further provides an efficient method of revocation of all child permits without the called actually knowing all of the child permits identifiers.

In an embodiment, data indicative of the at least one permission is an object comprising at least one name-value pair. In an embodiment, the name of the name-value pair is represented by a string and the value of the name-value pair is represented by a string and/or at least one further name-value pair. In an embodiment, the string is arbitrary and/or user generated. In an embodiment, the value is arbitrary and/or user generated. Advantageously, using name-value pairs and in particular user generated name-value pairs allows for greater flexibility in the design of the security permit system and further enables the namespace features as discussed below.

In an embodiment, the request is received via an API that is only provided to computing modules belonging to a secure computing environment. In an embodiment, a computing module conducting the method of any one or more of the embodiments herein is a part of the secure computing environment. Advantageously, where the requests originate from a secure computing environment, the request can, in many cases, be presumed to be valid. By presuming a request is valid, processing time can be saved as other checks (such as signature validation, authorisation, validation of the request itself, and other checks) may be skipped thereby reducing the processing time and computing resources required to process the request.

In an embodiment, the first permit is part of a hierarchy of permits. In an embodiment, the first permit data comprises data indicative of a parent permit. In an embodiment, the first permit data comprises data indicative of children permits. Advantageously, a hierarchical permit structure enables alternative and improved management of permits. In an embodiment, the hierarchy is such that when a parent permit is revoked, its children are also revoked. Having parents and children preferably provides a hierarchical tree structure. Further advantageously, a hierarchical structure allows for the parent and child relationship thereby enabling the advantages discussed below in relation to namespaces, child creation limitations, and cascading revocations.

In an embodiment, the first permit data comprises at least one namespace, wherein each namespace defines part of a permission a child of the first permit can have. Advantageously, this provides a way to limit what permits can do such that if a child and/or parent permit becomes compromised in any way, the child permit will be limited in what further permissions it is able to receive and/or generate on other permits.

In an embodiment, the first permit data comprises an indication as to whether further permits may be generated that are children of the first permit. In an embodiment, the first permit data comprises an indication as to a maximum depth of descendants that the first permit can have. In an embodiment, the first permit data comprises a maximum number of children permits that the first permit can have. In an embodiment, the first permit data comprises an array to indicate a maximum number of descendant permits that the first permit can have at different depths. Advantageously, limiting the number of children (even to zero), the depth of children, and/or the number of children at different depths a permit can create provides increased security as these limitations allow parent permit holders to limit what a potentially compromised and/or adversarial first permit holder can do.

In an embodiment, the first permit data comprises a time that indicates when the permit is valid from. In an embodiment, the first permit data comprises a time that indicates when the permit is valid until. Advantageously, providing time values for when the permit is valid from or until allows greater flexibility for the parent permit holder to select when the permit can be valid. Further, the security of the system is increased by limiting the time the permit is valid. Limiting the time a permit is valid from/to limits the amount of time an adversarial third party can interfere with the permit.

In an embodiment, the first permit identifier obliviates the identity of the holder of the first permit. In an embodiment, the first permit identifier is a pseudo-randomly generated string of characters. Advantageously, having the permit identifier not identify the user associated with the permit further increases the security as it is much more difficult for an adversarial third party that has access to the identifier to cannot identify, impersonate, approach and/or otherwise interact with/as the associated user.

In an embodiment, the method further comprises the step of transmitting data indicative of the request for storage in a log or for inclusion on a blockchain. Preferably, the data indicative of the request is configured to provide an indication as to the state of the permit. More preferably, a set of data indicative of previous interactions with the permit is configured to provide an indication as to the current state of the permit.

Advantageously, storing all of the interactions with the permit (and in particular any "send" interactions which modify the permit) including the permit's creation, the set of interactions can be used to reconstruct the permit. This reconstruction can be compared with the permit's current status to ensure that nothing about the permit has been tampered with thereby further increasing the security and ability for third parties to rely on the secure status of the permit. The use of a blockchain to record the interactions provides even more security as the blockchain provides extra security and public, verifiable, non-malleability of the log of interactions.

In more detail, the system of the third aspect comprises a first computing module configured to generate the first request, and a permit computing module configured to conduct any one of the embodiments of the method of the third aspect. In an embodiment, the permit computing module belongs to a secure computing environment. In an embodiment, wherein the first computing module is a further permit computing module and the further permit computing modules belongs to the secure computing environment.

Advantageously, where the devices are all running in the same secure computing environment, this can act as a way to confirm that the requests are originating from a secure source and therefore can be presumed (in many cases) to be valid. By presuming a request is valid, processing time can be saved as other checks (such as signature validation, authorisation, validation of the request itself, and other checks) may be skipped thereby reducing the processing time and computing resources required to process the request.

In an embodiment, the first computing module is a user device. Advantageously thereby allowing other users to interact with permits.

In more detail, the device of the third aspect comprises a processor and memory, the memory including executable instructions that, as a result of execution by the processor, causes the device to perform the computer-implemented method according to any one of the embodiments of the method of the third aspect.

According to the third aspect, there is also described a non-transitory computer readable storage medium comprising computer program code instructions, being executable by a computer, to conduct any of the embodiments of the method of the third aspect.

In a fourth aspect, the present disclosure proposes methods, devices, systems, and computer programs for adding further permissions to a first permit. In more detail, the method of the fourth aspect comprises: receiving a request comprising a first permit identifier, wherein the first permit identifier identifies the first permit, and obtaining a first permit data based on the first permit identifier wherein the first permit data comprises data indicative of at least one permission and wherein the at least one permission provides an indication of one or more actions a holder of the first permit can take and/or what the holder of the first permit is allowed to do, wherein the request is to add a set of further permissions to the first permit and the request comprises the set of further permissions.

In an embodiment, the method comprises determining that the sender of the request is a computing module associated with a parent permit and/or a holder of the parent permit and wherein the parent permit is the parent permit of the first permit. In an embodiment, if the sender of the request is not the parent permit or the holder of the parent permit, the request is not processed. In an embodiment, determining that the sender of the request is the computing associated with parent permit or the holder of the parent permit comprises comparing a permit identifier comprised in the received request and a parent identifier comprised in the first permit data and confirming the sender of the request is the computing associated with parent permit or the holder of the parent permit based on the comparison. In an embodiment, determining that the sender of the request is the process associated with the of the first permit comprises validating a cryptographic signature of the request. In an embodiment, validating a cryptographic signature comprises validating that the signature was signed by the holder of the parent permit. Advantageously, through use of cryptographic means, or ensuring that the request has come from a known secure process, the security of the system is increased as invalid requests to revoke the permit or subset of permissions will be rejected.

In an embodiment, the step of continuing processing the request based on a determination of whether the first permit has been revoked. In an embodiment, the step of determining whether the first permit has been revoked comprises checking a revoked field in the first permit data. In an embodiment, the step of determining whether the first permit has been revoked comprises checking whether a first time stored in the revoked field is earlier than a current time.

In an embodiment, the method further comprising the step of determining a maximum number of sets of permissions would not be exceeded with the addition of the set of further permissions and continuing processing the request based on the determination. In an embodiment, the at least one permission comprises data indicative of a maximum number of permissions that can be associated with the permit. Advantageously, the permits have inbuilt customisable limitations thereby increasing the security of the permits themselves.

In an embodiment, the request comprises a string to identify the set of further permissions. In an embodiment, the string is user generated. Advantageously, allowing strings to represent groups of permissions provides an efficient method of revoking them as compared with listing each individual permissions a user wishes to revoke. Further, by referencing groups of permissions by their identifier, the efficiencies are gained by not needing to reference each permission individually or iterate over groups of permissions.

In an embodiment, the method further comprises the step of adding the set of further permissions to the permit.

In an embodiment, data indicative of the at least one permission is an object comprising at least one name-value pair. In an embodiment, the name of the name-value pair is represented by a string and the value of the name-value pair is represented by a string and/or at least one further name-value pair. In an embodiment, the string is arbitrary and/or user generated. In an embodiment, the value is arbitrary and/or user generated. Advantageously, using name-value pairs and in particular user generated name-value pairs allows for greater flexibility in the design of the security permit system and further enables the namespace features as discussed below.

In an embodiment, the request is received via an API that is only provided to computing modules belonging to a secure computing environment. In an embodiment, a computing module conducting the method of any one or more of the embodiments herein is a part of the secure computing environment. Advantageously, where the requests originate from a secure computing environment, the request can, in many cases, be presumed to be valid. By presuming a request is valid, processing time can be saved as other checks (such as signature validation, authorisation, validation of the request itself, and other checks) may be skipped thereby reducing the processing time and computing resources required to process the request.

In an embodiment, the first permit is part of a hierarchy of permits. In an embodiment, the first permit data comprises data indicative of a parent permit. In an embodiment, the first permit data comprises data indicative of children permits. Advantageously, a hierarchical permit structure enables alternative and improved management of permits. In an embodiment, the hierarchy is such that when a parent permit is revoked, its children are also revoked. Having parents and children preferably provides a hierarchical tree structure. Further advantageously, a hierarchical structure allows for the parent and child relationship thereby enabling the advantages discussed below in relation to namespaces, child creation limitations, and cascading revocations.

In an embodiment, the first permit data comprises at least one namespace, wherein each namespace defines part of a permission a child of the first permit can have. Advantageously, this provides a way to limit what permits can do such that if a child and/or parent permit becomes compromised in any way, the child permit will be limited in what further permissions it is able to receive and/or generate on other permits.

In an embodiment, the first permit data comprises an indication as to whether further permits may be generated that are children of the first permit. In an embodiment, the first permit data comprises an indication as to a maximum depth of descendants that the first permit can have. In an embodiment, the first permit data comprises a maximum number of children permits that the first permit can have. In an embodiment, the first permit data comprises an array to indicate a maximum number of descendant permits that the first permit can have at different depths. Advantageously, limiting the number of children (even to zero), the depth of children, and/or the number of children at different depths a permit can create provides increased security as these limitations allow parent permit holders to limit what a potentially compromised and/or adversarial first permit holder can do.

In an embodiment, the first permit data comprises a time that indicates when the permit is valid from. In an embodiment, the first permit data comprises a time that indicates when the permit is valid until. Advantageously, providing time values for when the permit is valid from or until allows greater flexibility for the parent permit holder to select when the permit can be valid. Further, the security of the system is increased by limiting the time the permit is valid. Limiting the time a permit is valid from/to limits the amount of time an adversarial third party can interfere with the permit.

In an embodiment, the first permit identifier obliviates the identity of the holder of the first permit. In an embodiment, the first permit identifier is a pseudo-randomly generated string of characters. Advantageously, having the permit identifier not identify the user associated with the permit further increases the security as it is much more difficult for an adversarial third party that has access to the identifier to cannot identify, impersonate, approach and/or otherwise interact with/as the associated user.

In an embodiment, the method further comprises the step of transmitting data indicative of the request for storage in a log or for inclusion on a blockchain. Preferably, the data indicative of the request is configured to provide an indication as to the state of the permit. More preferably, a set of data indicative of previous interactions with the permit is configured to provide an indication as to the current state of the permit.

Advantageously, storing all of the interactions with the permit (and in particular any "send" interactions which can modify the permit) including the permit's creation, the set of interactions can be used to reconstruct the permit. This reconstruction can be compared with the permit's current status to ensure that nothing about the permit has been tampered with thereby further increasing the security and ability for third parties to rely on the secure status of the permit. The use of a blockchain to record the interactions provides even more security as the blockchain provides extra security and public, verifiable, non-malleability of the log of interactions.

In more detail, the system of the fourth aspect comprises a first computing module configured to generate the first request, and a permit computing module configured to conduct any one of the embodiments of the method of the fourth aspect. In an embodiment, the permit computing module belongs to a secure computing environment. In an embodiment, wherein the first computing module is a further permit computing module and the further permit computing modules belongs to the secure computing environment.

Advantageously, where the devices are all running in the same secure computing environment, this can act as a way to confirm that the requests are originating from a secure source and therefore can be presumed (in many cases) to be valid. By presuming a request is valid, processing time can be saved as other checks (such as signature validation, authorisation, validation of the request itself, and other checks) may be skipped thereby reducing the processing time and computing resources required to process the request.

In an embodiment, the first computing module is a user device. Advantageously thereby allowing other users to interact with permits.

In more detail, the device of the fourth aspect comprises a processor and memory, the memory including executable instructions that, as a result of execution by the processor, causes the device to perform the computer-implemented method according to any one of the embodiments of the method of the fourth aspect.

According to the fourth aspect, there is also described a non-transitory computer readable storage medium comprising computer program code instructions, being executable by a computer, to conduct any of the embodiments of the method of the fourth aspect.

A person skilled in the art will appreciate that the aspects described above may be used in any combination with each other. For example, the first and second aspect may be combined such that there is one method conducting validation of a permit and the addition of a further permit.

Example System Overview

FIG. 1 shows an example system 100 for implementing permits as described herein. The system comprises a number of computing modules 102, 104, 106 internal to a secure processing environment 108. Outside of the secure processing environment there are a number of client devices 110, 112. The client devices 110, 112 are configured to interact with some of the computing modules 102, 104, 106 of the secure processing environment. Preferably, the computing modules 104, 106 have an associated address and can receive requests comprising that address. Optionally, the computing module 102 is a gateway module configured to receive requests from client devices 110, 112 and forward them to the correct computing module 104, 106 according to an address stored in the request.

Preferably, the computing modules 102, 104, 106 are implemented as a microservices running within the secure processing environment 108. Optionally, the secure processing environment is a single server or single collection of servers within a computer network. Alternatively, the computing modules are implemented as a part of a serverless system and the serverless system defines the secure processing environment. Example serverless environments include AWS Lambda™.

Preferably, the computing modules 102, 104 have an associated process identifier. The process identifier is the same for all processes associated with permits in the secure processing environment 108. Here a process identifier identifies a class of similar computing modules. The computing modules are also described herein as instances with "instance identifiers" of "instanceld" s. Optionally, the process identifier is stored in a permit data instance.

As is described below under the heading "Interactions with Permits", each permit comprises an associated computing module (the reverse can also be considered true that each computing module has an associated permit). Thus, when an operation is conducted on a permit, this preferably comprises interacting with the computing module associated with the permit. Preferably the interactions are conducted by sending a request to the computing module associated with the relevant permit.

Optionally, there exists a computing module manager 114 within the secure processing environment 108. Preferably, this computing module manager 114 is configured to create new processes within the secure processing environment 108.

Permit and Permit Contents

Permits provide a way to identify a user and state what that permit holder is able to do. The identification aspect is conducted through use of public key cryptography and the "what a holder can do" is conducted through use of permissions as described herein.

In an embodiment, each permit has an associated permit data instance (which is also described as associated permit data or permit data). Permit data instance comprises data about the permit itself as well as the permissions which set out what the holder of the permit can do. Preferably, each permit comprises at least one permission and more preferably, a plurality of permissions. A permission is configured to determine what the holder of the permit is able to do. Preferably, a permission is defined by a name-value (also called a key-value) pair. Preferably the name is a string of characters. More preferably, the string of characters is human readable and provides an indication as to what the permission relates to. Preferably, the value is a string, number, or a data structure where the data structure is a name-value pair or pairs. Permissions are preferably of the form as discussed in further detail below under the heading "Permissions". Where referring to a permit comprising a permission or permissions as used herein, this preferably refers to the permit data instance comprising a name-value permission. Permissions are preferably provided in sets or groups (called permissionSets in an example described herein). Preferably groups of permission(s) are part of each permit as an "extension". Extensions are discussed further below under the heading "Extensions".

Each permit also comprises data such that the identity of the holder of the permit can be verified. Preferably the permit comprises a public key associated with the holder of the permit. Verification of the identity of the permit holder can be determined by the holder signing a message (or any data) with their private key then the party verifying the identity of the permit holder can compare the signature and message against the public key associated with the permit holder. Preferably the public key associated with the permit holder is stored in the associated permit data instance.

Preferably, each permit is identified by a permit identifier. Preferably, the permit identifier provides no indication as to the contents of the permit. Preferably, the permit identifier is a pseudo-randomly generated string.

In an embodiment, the system provides a method of verifying a user's signature against their permit thus verifying that the user is or is not the holder of the permit. Preferably, the verification is performed according to the method as described under the heading "Verify Signature".

Preferably, permits are part of a hierarchy. Referring to FIG. 2, a hierarchy of permits 200 are shown. All permits (except for the root 202) will have a parent permit and optionally a child or children permits. Preferably, a child permit cannot have more than one parent. The resulting permit hierarchy structure is a tree. Parent permits are able (subject to various limitations that are imposed on the permit themselves, these are discussed in greater detail below and in particular under the heading "Add Child Permit") to create child permits. Preferably, when a parent is revoked, so too are its children. More preferably, this process is recursive such that all of the descendants of the parent permit are also revoked. This can be considered as a cascading revocation starting from the parent permit.

Preferably, permits comprise a set of rules which allows permit holders to create child permits containing permissions within a given "domain" or "namespace", but not across to other domains or namespaces. Using these namespaces prevent separate organisations from interfering with other organisations using the permit system. The set of rules can be found in the Special Permissions as discussed below.

Further, the set of rules allows delegation of powers to child permits, giving them rights to create grandchildren withing the domain or namespace, subject to optional depth and total count limits. These limitations are recursive in that children preferably inherit the same or more restrictive delegation of powers of the parent.

The top-level root permit 202 has the ability to create a large or even unlimited number of child permits with little to no limitations. With such a broad ranging ability, the private/public key pair used in creation of the root permit is preferably securely managed. Preferably, the private key associated with the root permit is kept offline on a secure device.

The creation of the top-root permit 202 (and not an organisation level root permit 206, 208, 210) is a one-time process. The method is similar to the creation of a child permit, except there is no parent permit to refer to and as such, all the checks that relate to checking a parent's permissions, authentication, authorisation, and other features are skipped or otherwise ignored. In the present embodiment, this is preferably run once and never again.

In the example permit hierarchy 200 of FIG. 2, there are four different organisations that are using permits. nChain™ are the holders of the root permit, and Org ABC, Org PQR, and Org XYZ are all using permits that are children of nChain's permits. A skilled person will understand that specific companies are used by way of example only. Further, any number of organisations may be present in such a permit system. The example hierarchies and organisations shown in FIG. 2 exemplify the flexibility of permit construction when using a number of the present embodiments described herein.

Continuing with the example, Org ABC has an organisation level root permit 206. This a root permit in that it is the root of Org ABC's permits and not the top-level root 202 of the entire tree. Org ABC has created at least two child permits 212, 214. These child permits are for different customers and/or end users.

Org XYZ has a root permit 210. Org XYZ has chosen to have a different hierarchy structure where there is a permit per-country. The XYZ UK permit 216 is shown with at least two permits 218, 220 for members and/or end users.

In an embodiment, the holder of the root permit creates a number of child permits 204 with the same holder. These child permits are configured such that they can create further child 206, 208, 210 permits for other users of the system. This way, the top-level root permit 202 does not need to be used for further permit creation every time a new user or organisation wants a permit. Thus reducing the chances of an attack occurring and improving security of the root permit.

Preferably, every permit contains a reference to its parent and one or more named permissions. Upon creation, the parent will supply data indicative of a set of permissions and a public key associated with the permit holder (holderPubKey). As can be seen in the example permit data instance below, permissions are stored under the extensions ["default"] object by default. The creation of a permit is described in greater detail under the heading "Add Child Permit".

Preferably, permit information is tracked in a data structure called a permit data instance or permit data. The data structure comprises at least some of the following elements presented in the table below. Preferably all of the elements are required. Some of the values to the elements can be set to null, zero, or are zero length. More preferably, the parent is required and not null.

Optionally, the permit is valid from the current time until an end time and date. Preferably wherein the end time and date is set in the permit data instance under the "revoked" element. Once revoked, a permit cannot be reactivated. For temporary deactivation of a permit (or a subset of the permissions thereof), revocation and addition of extensions as discussed below under the heading "Extensions" can be used.

TABLE 1

| Permit Data Instance Elements | | |
|---|---|---|
| Element Name | Preferable Data Type | Description |
| parent | String | Fixed for the lifetime of the Permit The instanceId of the parent Permit. |
| extensions | A map of objects comprising permissions (described in table below) | Must include at least one permission. |
| children | Array of strings | A list of zero or more child references. The element order has no particular relevance. Each child reference is to an instanceId of a child. |
| revoked | ISO 8601 | Initially set to null The effective date when this entire permit is considered to be revoked. |

Preferably, determining whether a permit has been revoked or not depends on the current time. Each permit comprises a "revoked" element that comprises a time. For a permit to be considered revoked, the current time must be after the revoked time stored on the permit. More preferably and in accordance with a further embodiment, there is provided a method where a permit is provided a time in the future and it returns whether it will be valid at that time or not.

Preferably a map of named permissions are referenced by their name in the extensions map. The name 'default' will be used when storing the initial extension.

Alternatively, no extensions map is used and only one set of permissions are associated with the permit.

Each extension comprises a number of elements. Example elements of an extension is provided below in Table 2. Preferably all of them are required.

TABLE 2

| Extension Elements | | |
|---|---|---|
| Element Name | Data Type | Description |
| holderPubKey | String | A cryptographic (preferably Elliptic Curve) public key used to validate the identity of the permit holder. This key is preferably a Base64 encoded DER. |
| permissionSet | Preferably a JSON object | Each permission within a permission set is defined by a name-value pair (alternatively described as a key-value pair. The name is preferably a period separated namespace string (e.g. com.nchain) and the value may be a JSON string, array or object. Permission |

TABLE 2-continued

| Extension Elements | | |
|---|---|---|
| Element Name | Data Type | Description |
| | | names inherit from the namespace of their parent. |
| revoked | ISO 8601 | The effective date when this extension is considered to be revoked. Preferably, once revoked, an extension can only be reactivated by replacing it with entirely new extension data. |

An example permit data instance with all of the elements used (although some are set to null) is shown below in JSON format.

```
{
  "parent": " < instanceId of parent > ",
  "extensions": {
    "default": {
      "holderPubKey": "12c6DSiU4Rq3P4ZxziKxzrL5...",
      "revoked": null,
      "permissionSet": {
        "$.children.namespace": [
          "com.example.user",
          "com.example.country.uk"
        ],
        "$.children.levels": 2,
        "$.children.max": [10, 10],
        "$.extensions.max": 2,
        "$.root": false,
        "$.valid.after": "2021-11-16T10:30:05Z",
        "$.valid.before": "2022-11-16T10:30:05Z",
        "com.example.distributor": {
          "id": " < UUID > ",
          "name": "uk321"
        }
      }
    },
  },
  "children": [
    " < instanceId of child 1 > ",
    " < instanceId of child 2 > ",
  ],
  "revoked": null,
}
```

A skilled person will understand that the above is an example permit and that some features of this permit data instance may be removed, not used, or modified depending on the particular embodiment described herein. A skilled person will further understand that JSON is provided here by way of example of representing the permit. The permit and its contents may be represented using other formats such as XML, a binary encoded format, or any other appropriate format.

Figure 3A:
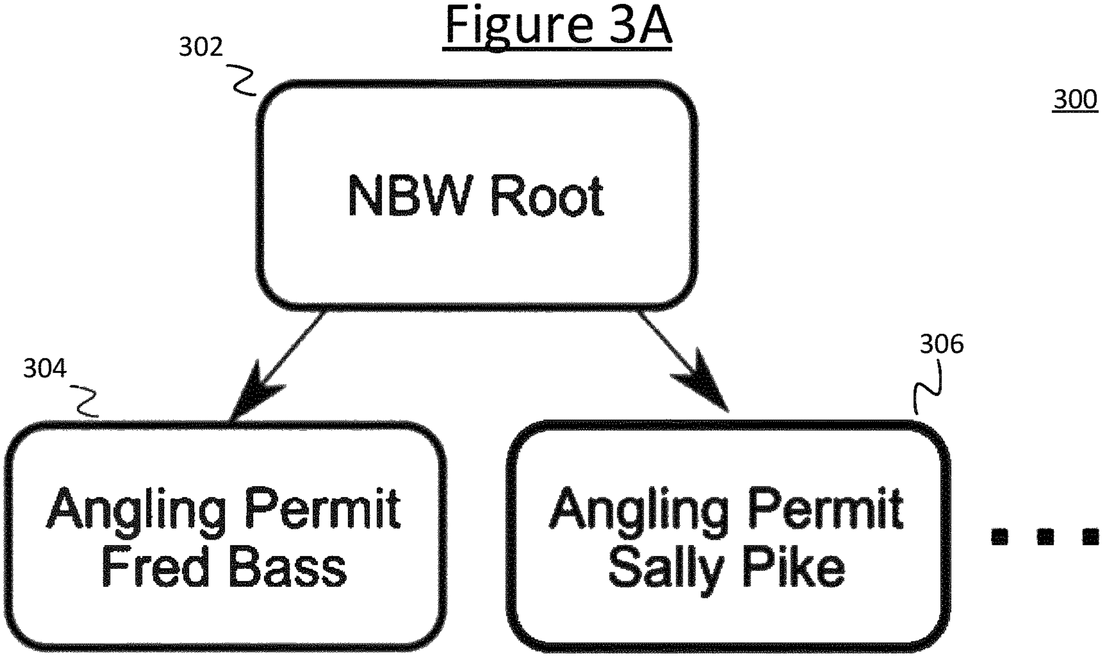

Referring to FIG. 3A, a simple example is shown (which has left out the ultimate, top-level root permit). Here the organisation's root permit 302 has at least two child permits 304, 306. The organisation is the NBW (National Bureau of Waterways) which issues fishing permits 304, 306 (limited to anglers in the present example). Optionally, the NBW provide a mobile application which holds the identifier to the holder's permit and a secret key which allows the holder of the permit to verify they hold it. Each angler's permit 304, 306 comprises a permission called "org.nbw.angler.rights" and preferably has the following structure:

```
{
  "type": "rod",
  "species": ["carp", "tench", "pike"]
}
```

Optionally, there are other permissions associated with personal identity such as a membership number and the user's name.

In use, a fishing inspector that is wishing to confirm that a user (such as Fred Bass who holds the first child permit 304) is fishing with the correct type of equipment and catching the correct type of fish could use this permit to do so. The inspector can use the permit identifier (preferably obtained from Fred Bass' phone via a QR code). With this permit identifier, the inspector can query the permit instance themselves to validate both the permissions (so that Fred Bass is using a rod and only catching carp, trench, or pike) and the identity (so that Fred is actually the holder of the permit and he has not copied someone else's permit identifier).

Permissions

Preferably the permissions are namespaced. More preferably, the permissions are namespaced by limiting what the name of the name-value pair can be. Preferably, namespaces use a reverse DNS domain-like structure separated by '.' (full stops). Some example namespaces are:

com.example.user.id.

com.example.user.type com.example.acme.user.id org.nbw.angler

As can be seen, these namespaces are constructed from left to right where the left-most prefix is the least specific feature, and the right-most suffix is the most specific feature.

Preferably, both the name and value of the name-value pair of these permissions are customisable (as long as the name is within the parent permit's allowable namespace). Preferably, both the name and value can be any arbitrary value. Preferably, both the name and the value are supplied by a user of the permit system. Thus, the name and value are user generated. By providing user generated and/or customisable names and values, the use cases for permits can be very flexible, thereby allowing their use in a great number of different applications.

Preferably, namespaces can only get longer. This can also be understood as saying that a child permit's permissions can only be a subset of what is allowed according to the parent permission(s). Preferably the namespaces allow the permissions to be structured into a hierarchy (this is additional and separate to, although will often match, the permits also being hierarchical).

Preferably, the permission hierarchy follows the same structure as the permit. This can also be understood that each child permit comprises permissions that are a subset (namespace wise) of the parent.

A special set of permissions, prefixed with the '$' namespace, provide information and/or limitations about the permit itself. The '$' namespace provides limitations on what permissions these permits can add to child permits. These limitations can include:

- Enforcement of one or more namespace prefixes on all permissions in children,
- Delegation of rights to create further permits to children, recursively to a given depth,
- Limitation of numbers of children and further descendant that can be created, and/or.
- Limitation of the number of extensions (discussed below under the heading "Extensions") that can be created.

Alternatively, the information stored in these special permissions (i.e. the limitations of the permit and other information) is not stored in special permissions and are instead stored on the permit data instance. Preferably, each of the limitations are stored as their own element on the permit data instance. A skilled person will appreciate that these limitations can be stored in any number different locations associated with the permit.

Optionally, the '$' namespace is also used to define the validity range of the permit.

TABLE 3

Example Special ($) permissions

| Permission Name | Purpose/Description |
|---|---|
| $.children.namespace | Restrict permissions in child permits created by this permit to be prefixed with the given namespace (if a single string) or one of a set of namespaces (if an array of strings). If absent, no children may be created. |
| $.children.levels | Restrict ability to create child permits to the given depth. If 0 or absent, no children may be created. Children must have a value at least one less than their parent (if any). If absent or 0, no children may be created. |
| $.children.max | Restrict the numbers of child permits that can be created. If an array, the first element applies at this level and subsequent values apply to subsequent deeper levels. If absent, no limit to the number of children this permit can create. The child must pass down the constraint (with the first item removed, optionally narrowed further) to its own children. |
| $.extensions.max | Restrict the number of extensions that this permit can have (including the default). If absent, no extensions can be added. |
| $.root | Special permission set only in the overall root permit (true/false) |
| $.valid.after | Time after which this set of permissions is valid (ISO 8601, inclusive) |
| $.valid.before | Time before which this set of permissions is valid (ISO 8601, exclusive) |

The special ($) namespace does not need to adhere to the "$.children.namespace" rules as set out above. Preferably, only a particular set of special permissions are possible to create. More preferably, the above set are the only special permissions a permit can have.

Preferably, the $.valid.after and $.valid.before permissions use local time. Preferably, the permissions are optional and are not required. Preferably, $.valid.after and $.valid.before define a validity range of the permit and/or extension. Preferably, if a parent has either of the $.valid.after and $.valid.before permissions set then any children created from it must pass on the same or a more narrow window of time. Thus it can be seen that the validity range of a child permit cannot exceed that of its parent permit.

These special permissions are preferably stored only in the initial/default extension as these special permissions refer to the permit as a whole. Any special permissions stored in different extensions are either ignored or rejected.

Referring to the previous example of FIG. 3A, the NBW root permit 302 comprises at least the following permissions:

$.children.namespace="org.nbw"

$.children.levels=1

These permissions state that the holder of the NBW root permit 302 can create as many child permits as required as long as the child's permissions start with "org.nbw" and the children are only one level deep.

Figure 3B:
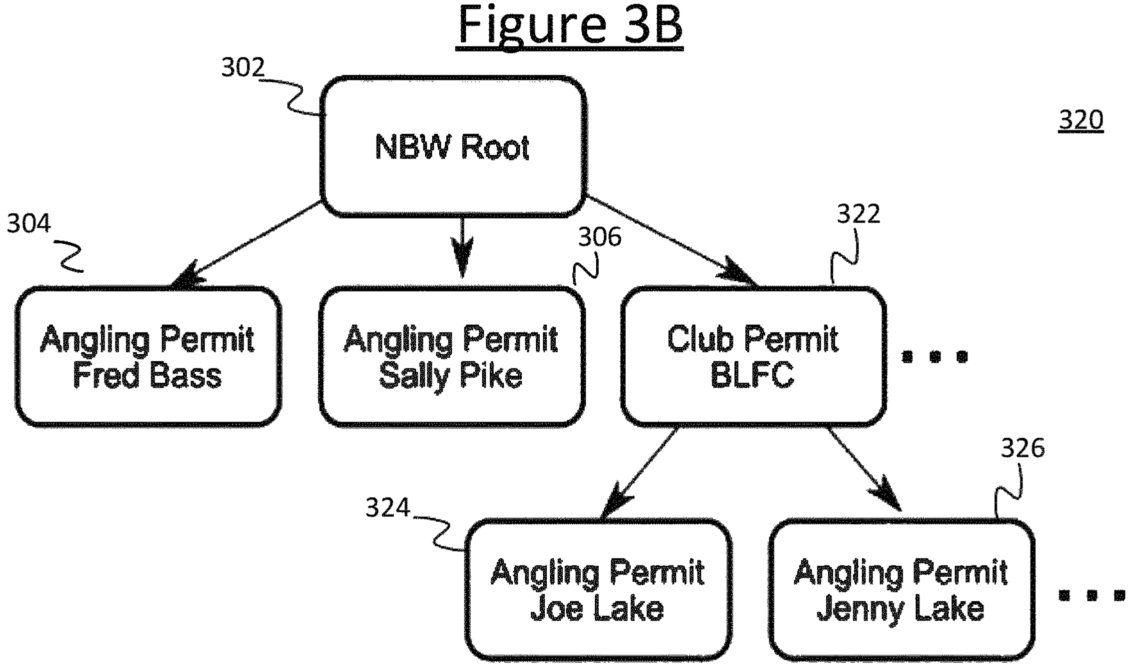

Referring to FIG. 3B, a further example permit structure 320 is shown here. The structure is similar to that as described with reference to FIG. 3A. The NBW root permit 302 has their "$.children.levels" permission equal to two (or more). In the present example, the NBW permit 302 holders would like to allow a club to create permits for its own members. The NBW permit 302 creates the Club Permit BLFC 322 (Big Lake Fishing Club) which comprises the following permissions:

org.nbw.club.id="BLFC"
$.children.namespace="org.nbw.angler"
$.children.levels=1
$.children.max=50

These permissions allow the BLFC to create up to 50 permits for its members, but only permissions that are within the namespace "org.nbw.angler". As such, permissions like "org.nbw.club.id" are not allowed for any children and therefore children cannot not impersonate the permissions of a club permit (for example, if a child permit comprised the permission "org.nbw.club.id", the child could pretend to be a club themselves and conduct any actions associated with a club) or any other similar permissions.

The BLFC permit 322 creates at least two child permits 324, 326. These child permits must have permissions that are prefixed with "org.nbw.angler".

Extensions

Preferably, permissions are stored in "extensions". Preferably the extensions comprise: sets of permissions (called permissionSets), a revoke element, and a holderPubKey element. The extensions are stored on the permit data instance in an extension map and are referenced by a name. Preferably, the name is user generated. Preferably, the name is human readable. Optionally, initial extension and/or default extension is labelled "default". Here, human readable is any encoding such that it can be naturally read by humans. Preferably, the encoding is ASCII or Unicode text.

Extensions preferably provide a way to reference a group of at least one permission. More preferably, permissions provides a human readable way to reference a group or set of at least one permission. As discussed above in Table 2, each extension comprises a number of elements, including a set of permissions.

An extension can also be described as comprising, defining, or being a subset of the permissions of the permit the extension belongs to.

A skilled person will appreciate that strict adherence to the structure and format of the extensions and how they are stored is not necessary. Alternative structures may be possible for the extensions and/or collections of permissions. Example alternatives could be that the extensions may not strictly be stored in an extensions map and could be stored in a list or other appropriate data structure. Extension objects as described herein alternatively may also have a different structure in that they merely comprise a list of permissions or a list of permission references and the permissions themselves are stored elsewhere on the permit.

During the lifetime of the permit, extensions may be used to add and replace sets of permissions. Extensions may be added or revoked by the parent permit. Preferably, all permissions that are added to a permit are signed by the holder of the parent permit.

Adding extensions to permits is discussed in greater detail under the heading "Adding Extensions". Revoking extensions is discussed in greater detail under the heading "Revoking Extensions".

In an embodiment, extensions enable a permit holder to associate different devices with a permit. For example, if the permit is for access to a particular resource (optionally a computing resource), then a single permit holder might have an "iPhone" extension to manage their iPhone's interactions and a "desktop" extension to manage their desktop computer's interactions with the computing resource. As mentioned above, it is possible to revoke an extension. Advantageously, if the user were to lose their iPhone, they can contact their permit provider (which has control over the parent permit that created this user's permit) and they can revoke the iPhone extension without affecting the user's other devices' interactions with the service. Thus it can be seen that the extension system provides improved flexibility and control when it comes to providing/removing access to resources. Coupling this with the central control of the permits and/or lack of a Certificate Revocation List (CRL, further discussed under the heading "Revoke Permits"), computing resources can be saved when it comes to validating permissions within the relevant extensions by not requiring the distribution and maintenance of such a list.

Interactions with Permits

As discussed above, the permit system described herein is preferably interacted with using requests. Preferably, the requests are HTTP requests. More preferably, the requests are sent to REST endpoints. There are two relevant REST endpoints:

. . . /send to request operations on a permit including creation and revocation of children, and . . . /query . . . /check a permit's validity and permissions.

Preferably, a number of the interactions will require the request comprises a signature, thus an organisation wishing to interact with their permits for creation, revocation, or other interactions, will need to have a private/public key pair set up. Any requests will also need to comprise the instance id of the permit of interest. The instance id and the public key can be publicly viewable or knowable, however the private key must be kept secret.

Transmitting a request to these endpoints can also be described as "calling" them as they are presented as a RESTful API. Thus, the sender of the request can also be considered the "caller".

Preferably, any requests sent to the " . . . /send" endpoint are logged. Preferably the logging occurs on a blockchain such that a third party can audit the request. Preferably, any requests sent to the " . . . /query" endpoint are not logged.

Optionally, requests normally sent to the " . . . /query" can be sent to the " . . . /send" endpoint for logging. This option is useful for when the checking of a permit (or the permissions of the permit) is important and needs to be later verified. For example, if all permit holders need to have their permit checked before entering a location, it is likely necessary to log every time a permit is checked to ensure the check did actually happen.

In an embodiment, the interactions described under the headings "Create Child Permits", "Revoke Permits", "Revoke Extensions", and "Add Extensions" are logged onto a blockchain or at least a subset of the interactions are logged onto a blockchain. Preferably, all of these interactions are logged off-chain and a subset of the interactions are logged onto the blockchain. Preferably, the interactions are logged into collections of interactions where each collection of interactions relates to a single permit. Each collection of interactions also has an associated representation (through the use of transactions) on the blockchain. Thus, an auditor wishing to track interactions with the permit of interest can audit only the collection of interest.

Preferably, each of the interactions logged onto the blockchain comprises an immutable reference of the previous interaction (optionally also stored on the blockchain). Preferably, the reference is a hash of the previous interaction. Preferably, all interactions comprise a reference to the previous interaction thus establishing an immutable chain of all interactions. Thus, the immutable log only requires a subset of the interactions to be recorded on the blockchain. Optionally, only the first and last interactions are recorded on the blockchain.

Preferably, the logging is conducted using an Event Stream for each permit. Optionally, there is a logging service interacted with through an API to provide the logging embodiments. The Event Streams are as described with reference to:

- PCT/IB2021/051258 filed on 15 Feb. 2021 by nChain Holdings Limited,
- PCT/IB2021/051260 filed on 15 Feb. 2021 by nChain Holdings Limited, and
- PCT/IB2021/051333 filed on 17 Feb. 2021 by nChain Holdings Limited.

Preferably, the interactions described under the headings "Create Child Permits", "Revoke Permits", "Revoke Extensions", and "Add Extensions" are all provided using the . . . /send API endpoint.

Preferably, data indicative of any interactions with the permit are transmitted to an Event Stream through use of an Event Stream API. Preferably, the Event Stream API is a RESTful API. The current state of the permit can be verified by taking all of the interactions (including its creation) with the permit and recreating a "dummy permit" by conducting/replaying all the interaction steps again (this could also be described as a "dry run" in that no new permits are actually created). The final state of the "dummy permit" should have the same current state as the real permit. The same is true for verifying any intermediate state of the permit if said intermediate state is known.

Thus, it can be seen that through logging the interactions with the permit, the state of the permit is logged and therefore the current or any previous state is auditable and verifiable.

By submitting these state changes to the blockchain via Event Streams, the permit becomes auditable and verifiable permanently and with high confidence of data integrity.

Some example requests to an endpoint could comprise the following features in the header:

```
POST https://{AWS ID}.amazonaws.com/api/v1/processInstance/{instance
ID}/send
or
POST https://{AWS ID}.amazonaws.com/api/v1/processInstance/{instance
ID}/query
```

Where {AWS ID} is the id of an AWS™ endpoint and {instance ID} is the permit identifier. A skilled person will appreciate that other URLs and services may be used. For example, non-AWS URLs may be used. A skilled person will understand that requests provided herein are exemplary and may take different forms. The requests are shown as comprising the URL the request is being sent to. Optionally, the complete URL is not provided in such a manner and merely the path is provided.

Optionally the request header also comprises an AWS API key.

Preferably the body of a POST should be a JSON object containing a single property named for the message or interaction being sent. Preferably authentication and authorisation for the request conducted by signing the parameters with the sender's private key and placing the result in the signature property of the request. For example:

```
{
  "createChild": {
    "permitContents": "<stringified JSON object>",
    "signature": "<base64 signature over permitContents>"
  }
}
```

Note that the part of the request being signed will need to be sent as a string representation of the request contents and not a JSON object itself. This is to ensure that both the sender of the request and the receiver of the request use the same representation of the object (irrelevant of spacing, ordering, etc) for calculating the signature. Alternatively to stringifying, a canonical structure of the object could also be used. This canonical structure is optionally defined according to RFC8785. The canonicalisation scheme is one that is agreed upon by both the sender and receiver. The scheme may be agreed upon beforehand, or the scheme is identified by the sender such that the receiver understands which scheme is being used.

Preferably, where canonicalisation is used, the JSON object of the request can be sent unstringified and in any valid JSON form.

Preferably responses to the above mentioned requests are provided with a result property and an optional message. For example:

```
{
  "result": "ok",
  "msg": "Success! Permit created",
  ...
}
{
  "result": "error",
  "msg": "Invalid parameters",
  ...
}
```

The exact contents of the message (msg) will depend on the context of the request and how it is processed.

Below there are presented a number of different embodiments describing different interactions permits. Preferably any number of these embodiments may be used with any number of different other embodiments. A skilled person will appreciate that some embodiments may not be used in every conceivable system. For example, extensions may not be used and therefore any interactions relating to creation or revocation of extensions may not be used.

Create Child Permits

Referring to FIGS. 4A and 4B, example methods 400, 420 of creating a child permit are shown. Preferably, the first method 400 is run by, or on behalf of, a user (such as an organisation) wishing to create a new child permit of the permit they already hold. The second method 420 is preferably run by a permit computing module, such as the computing module 104 of FIG. 1. A person skilled in the art will appreciate some of the steps of each method may be performed by different parties and strict adherence of which member conducts which steps is not necessary.

Preferably, the public key of the holder of the new permit to be created is known or obtained 402. Optionally, obtaining the new public key comprises generating a new private/public key pair. Preferably, generation of private/public key pair is conducted by the holder of the new permit such that the holder of the parent permit (and/or the sender of the request to create the new permit) does not gain knowledge of the private key of the holder of the new permit. Thus, the new public key is received from the holder of the new permit.

The request to create the new permit is constructed 404 and comprises a number of features describing the new permit. Preferably, the features describing the new permit include at least data indicative of the permissions the new permit will have and the public key of the holder of the new permit holder. Optionally, the features describing the new permit further includes a validity range of the new permit.

Preferably, the features describing the new permit are signed using the parent permit's private key. More preferably, the features are converted to a string (also known as "stringified") and/or canonical data structure and the resultant string or data structure is signed. The request comprises the signature.

Optionally, the features describing the new permit are called "permitContents". By way of example, the request has the following form:

```
{
  "createChild": {
    "permitContents": "<stringified object>",
    "signature": "<base64 signature over permitContents>"
  }
}
```

A pre-stringified permitContents optionally is a JSON structure and has the following format:

```
{
  "permitContents":
  {
    "holderPubKey": "<new Permit's public key (Base64 DER) >",
    "permissionSet": {
      "<namespaced permission name>": "<permission
value>",
      ...
    },
  }
}
```

As noted above, an alternative to the stringified permitContents (or any other stringified JSON used herein), canoicalisation of the JSON can be used and the JSON structure of the request may be in a regular, unstringified form.

As an alternative to JSON, the permitContents and/or request could be in an XML format. Returning to the fishing example of FIGS. 3A and 3B, a specific example of the NBW wanting to create the Angling Permit for Fred Bass 304, the permissionContents for the creation of Fred's permit 304 could be:

```
{
  "holderPubKey":
"LS0tLS1CRUdJTiBQVUJMSUMgS0VZLS0tLS0KTUZZd0...",
  "permissionSet": {
    "org.nbw.angler.rights": {
      "type": "rod",
      "species": [ "carp", "tench", "pike" ]
    }
  },
}
```

The request is created and transmitted 408 by the user and received by the parent permit 422. As discussed above with reference to interacting with permits, the request comprises (preferably in the header) an address. Preferably that address comprises the permit identifier of the parent permit. Thus, the request is sent to, and received at, the computing module associated with the parent permit.

Referring to the method 420 of FIG. 4B, the steps relating to validation of the new permit and the parent permit are shown. Preferably, at least these steps are conducted by the computing module associated with the parent permit.

After reception 422 of the request, the permit instance data (also described as permit data) is obtained 424. Preferably, the computing module already has this information stored in memory. Alternatively, the computing module obtains the permit instance data from a repository and/or a database comprising other permit instance data.

As discussed below with reference to the present method and with reference to the other embodiments involving validation and/or verification steps, there are a number of validity checks conducted to ensure that certain features of the request and/or the permit are correct. The present description details the happy path where a received request and all of the data being validated is correct. Where anything is found to be invalid or incorrect however, the computing module will skip to the last step of this method 432 (or the last step 518 of the revocation method 500) and create and transmit a response to the sender. This response will be to indicate that the request failed and will optionally include the reasoning why it failed.

With the permit instance data, some validation is conducted on the parent permit itself relating to whether it can create child permits at all 426. Preferably, the parent permit validation comprises checking whether the parent permit has been revoked (as a revoked permit cannot create children, and all its children are considered revoked).

Preferably, the parent permit validation comprises checking its own permissions as to whether it can create children. Preferably this comprises ensuring that the parent permit has the number of hierarchical levels that can be created below itself at 1 or greater. With reference to the above discussed permit data instance embodiment, the means checking that the "$.children.levels" permission is 1 or greater. If the levels value is not set, this is the same as equalling zero and the parent permit cannot create children.

Preferably, checking its own permissions as to whether it can create children comprises checking that a maximum number of children has not been exceeded. With reference to the above discussed permit data instance embodiment, the means ensuring that "$.children.max" has not been set (meaning there is no limit) or has been set to a number greater than the number of children the permit already has, or been set to an array, where the first number in that array is greater than the number of children the permit already has.

Next, the request and its contents are validated 428. Preferably, the signature of the request is validated such that the permit computing module confirms that the request has been signed by the holder of the permit (or at least by someone that holds the private key associated with the public key of the parent permit). Preferably, this signature validation is conducted using the public key stored on the permit's data instance.

Optionally, if there is a validity range stored on the request for the new permit, a validation step is conducted to ensure that the validity range of the new permit does not exceed the validity range of the parent permit.

Preferably, the permissions of the new permit are validated such that they are within the scope of permissions that the parent is allowed to provide. With reference to the above discussed permit data instance embodiment, this means ensuring that the permissions being added on the new permit are within the namespace as outlined in the parent's "$.children.namespace". For example, the verification comprises ensuring that the parent permit comprises a namespace with "org.nbw.angler" (or a broader namespace such as "org.nbw" or "org") if creating a new permit with a permission of "org.nbw.angler.rights".

Further to the above, the namespace of permits the child is allowed to create is also verified to be the same or within the same scope as the parent permit. For example, if a parent's namespace is: ["org.nbw, angler", "org.nbw.club"] a child permit cannot have a namespace of: ["org.nbw" ] as it is broader than the parent's namespace.

Preferably, any one or more of the following further validations are conducted:

(A) the total levels the parent and/or child may have, (B) the maximum number of children a parent or child may have, and (C) the validity of the child has the same or a more narrow range as compared to the parent.

It should be noted that these validations are all to ensure that the child permit does not comprise any features that are broader or greater in number than the parent permit.

With respect to (A) above, if the child includes $.children.levels, then it must be less than the parents. With respect to (B) above, if the child includes a $.children.max it must fit within the envelope of the parent's array (if any) with the first element removed. Noting that missing levels in the parent mean there is no limit. With respect to (C) above, the $.valid. {before,after} must be at least as narrow as the parent.

Next, the new permit is created 430. Preferably, when used in combination with the embodiment as discussed with reference to FIG. 1, this step comprises sending a further request to the computing module manager 114. The computing module manager 114 creates a new computing module for the new permit and a new permit identifier.

A new permit data instance is created for or by the new permit and the relevant new contents of the permit are added to it. Example contents include the new permissions that were created in the second step 404 of the first method 400 and subsequently verified by the parent permit module in the second method 420.

Optionally, the new permit checks that the process that created it (the parent permit in the present case) is part of the same secure processing environment 108.

Preferably, the new permit sets the parent permit as its parent. More preferably, this is conducted by storing the instance id of the parent permit as the "parent" element of the new permit's data instance.

With the new permit process created, the new permit returns its own permit identifier to the parent permit. The parent permit adds the child's permit identifier to its list of children. Preferably, this means adding the instance id of the new permit to the "children" array element of the parent's data instance.

Finally, a response to the sender of the request is generated and transmitted to the sender. The response comprises an indication that the new permit was created successfully (or not if it was not created successfully) and the identifier of the new permit. Preferably, the new permit's identifier is also provided to the owner of the new permit such that they can reference it when necessary.

A skilled person will appreciate that a number of these steps may be considered optional depending on the usage context. In particular on the security context. For example, a parent permit may not need to conduct as many of the validation steps (like validating the signature, or whether the namespaces are correct) if the request has been received from a sender that is known to be configured to only generate valid requests.

Further, while the steps have been presented in a particular order here, this is for ease of description only. A skilled person would appreciate that any number of these steps could be done in any order and/or concurrently.

Revoke Permits

Referring to FIG. 5, there is shown a method 500 according to an embodiment of revoking a child permit. Preferably, the method is conducted by a parent permit where the owner of the parent permit is wishing to revoke a permit that is a child of the parent permit.

Preferably, a permit is only revocable by the owner of the parent permit. Optionally, a permit may further be revoked by any ancestor.

Preferably, whenever a permit is revoked, all of its descendants are revoked.

Advantageously, by providing a "revoked" field on each permit that is actively maintained by the operator of the system, holder of the permit, and/or holder of any parent permits, there is no requirement for a Certificate Revocation List (CRL). A CRL is a list of all digital certificates that have been revoked by an issuer. This enables more time and resource efficient usage of permits as, whenever a permit is used, the user/validator no longer needs to obtain the list, verify it is up to date, then finally traverse the potentially large list of permits that have been revoked.

Preferably, revocation of the permit cannot be undone. Temporary revocation of a subset of the permissions of the permit can be done through use of revoking and adding extensions which is discussed under the "Extensions" heading above.

Revoking a permit can optionally be considered as revoking a subset of the permissions of the child permit, where the subset is all of the permissions. In other words, by revoking the permit, you are also revoking all of the permissions of the permit and thus leaving the permit with no permission to do anything. Revoking a smaller subset of the permissions is preferably conducted by revoking extensions as discussed below under the "Revoke Extensions" heading.

A permit is preferably only able to directly send messages to computing modules associated with its child permits. In order to revoke all descendants, a permit must transmit a revoke message to all of its children, and each child must do the same. Thus the revocation process is a recursive one.

Preferably, a child permit verifies that the revoke message has been sent by its parent. When used with the embodiment as described with reference to FIG. 1, verifying that it is the parent computing module revoking the parent comprises checking the "instanceId" of the caller matches the parent instanceId stored on the child permit's data instance. Advantageously, because each permit computing module is part the secure processing environment 108, this check is sufficient to determine that the caller does have the appropriate permissions to conduct the revocation. Optionally, if the call has come from outside the secure processing environment and/or a system is used that is an alternative to the one described in FIG. 1, then further security would be required. The revoke message also comprises a cryptographic signature which has been generated by signing a portion of the message. The permit to be revoked can then cryptographically verify that the sender of the message is the parent permit (and/or optionally a holder of the parent permit) by checking against the parent's public key and/or using a further service that provides verification that a cryptographic signature matches a public key of a given instanceld. Optionally this is through the use of the method as discussed under the heading "Verify Signature".

Before this method 500 is run, the sender (the owner of the parent permit) creates a request comprising a permit indicator for the permit to be revoked. Optionally, the request comprises an indication as to what time the child permit will be considered revoked. Optionally, the request comprises an indication as to a particular extension to be revoked. Revocation of extensions is discussed in greater detail under the heading "Revoke Extensions".

Preferably, if an extension is provided, the descendants of the child permit will not be revoked.

Preferably, the request has a body according to the format:

```
{
  "revokeChild": {
    "revokeContents": "<stringified JSON object>",
    "signature": "<base64 signature over revokeContents>"
  }
}
```

Preferably, a similar process as with the create child permit request of creating the JSON object, stringifying it (or with use of canonicalization during the signing and verification steps), and subsequent signing of data is used here.

Preferably, the revokeContents element comprises the permit identifier and optionally comprises the revoke time and optionally the extension to be revoked. An example format for the revokeContents is:

```
{
  "child": "<child to be revoked's instance ID>",
  "time": "<ISO 8601 time that revocation will take effect>", //
optional
  "extension": "<extension name>" // optional
}
```

The caller sends the request to the parent of the permit they are wishing to revoke.

Upon reception of the request, the parent permit verifies 504 that it has not, itself, been revoked. If this parent has been revoked, then all of its children have already been revoked and processing time can be saved by not going through any further steps of this method.

Preferably, there is a check that the sender of the revoke child permit is the holder of the parent permit 506. Preferably, this is conducted by validating that the request has been signed by the holder of the permit (or at least by someone that holds the private key associated with the public key of the parent permit and thus presumably has the permission of the permit holder). Preferably, this signature validation is conducted using the public key stored on the permit's data instance.

Preferably, there is a check 508 that the provided child permit identifier is actually a child of the parent permit. As mentioned above, only a parent can revoke its children.

With these checks complete, the parent permit generates and transmits a further revoke request to the child permit. The further revoke requests optionally comprises the time to revoke the child permit and optionally comprises the extension to be revoked.

Preferably, the child permit checks that the sender of the further revoke request came from the parent permit. This can be conducted in a number of ways, including confirming that the address the request has been received on is an internal only address that only computing modules within the secure processing environment can use, or verifying a cryptographic signature associated or attached to the further revoke request was correctly signed by the parent permit. A skilled person would understand that other function caller identification methods are possible.

Preferably, the child permit is checked as to whether it has been revoked or not. Preferably, this check is conducted by the child permit itself, however the parent permit may also conduct this check. If the child permit has already been revoked, then no further action is required.

Preferably, the child is revoked 514. More preferably, the child permit is revoked by adding data that indicates that the child is revoked to the child permit's data instance. More preferably, the data is a time value from when the permit will no longer be considered valid.

If no time is provided in the revocation request, then the current time is determined and the current time is stored against the "revoked" element of the child permit's data instance.

With these time values set, the permit is considered revoked or will be considered revoked when the time set in the "revoked" field is in the past.

With the child permit revoked, the child permit then constructs similar further revoke requests for each of its children (these are grandchildren of the original parent permit). These further revoke requests will trigger each grandchild permit to follow the same steps of setting the same time in their "revoked" element as well as trigger the revocation of their children (and so on). Thus, through use of the same method in a recursive manner on children of different levels, the entire branch of permits, starting with the original child permit, will be revoked. This ensures that if a permit has been revoked, then all of its children will too.

The child permit will respond to the parent permit that it has been revoked. Optionally, each permit will wait until all of its children have been revoked and the parent permit will receive a message indicating that all of the descendants of the child have been revoked too.

The parent permit will then generate and provide a response 518 to the sender of the first revoke request.

A skilled person will appreciate that a number of these steps may be considered optional depending on the usage context. In particular on the security context. For example, a parent permit may not need to conduct as many of the validation steps (like validating the signature, or whether the namespace are correct) if the request has been received from a sender that is known to be configured to only generate valid requests.

Further, while the steps have been presented in a particular order here, this is for ease of description only. A skilled person would appreciate that any number of these steps could be done in any order or concurrently.

Revoke Extensions

As mentioned above, the method of revoking extensions is similar to that of revoking permits 500. As such, only the differences between the two methods will be described.

To revoke an extension of a rather than the permit itself, the name of the extension must be comprised in the request from the parent permit owner. An example request could comprise a stringified version of the following object (where iPhone, is the name of the extension to be revoked):

```
{
  “child”: “<child to be revoked’s instance ID>”,
  “time”: “<ISO 8601 time that revocation will take effect>”, //
optional
  “extension”: “iPhone”
}
```

The other change in the revoke permit method 500 is that instead of the step of revoking the permit 514, only the extension is revoked. This is conducted by locating the extension data structure and adding data to a “revoked” field to indicate that the extension has been revoked. Preferably time data is added to the revoked field. As with permit revocation, the time value is the value received in the revocation request (if present), or the current time (if no time value is present). Preferably, if a validity range is defined, the end of the validity range is set to the same time value.

Instead of revoking the child 514, only the extension is revoked 520.

As mentioned above, when revoking only an extension, no further permits or child permits are revoked and therefore no additional revocation messages are generated and sent to the child permits 516.

Add Extensions

In an embodiment, there is provided a method of adding extensions (preferably as discussed under the heading “Extensions”) to permits. Preferably, extensions can only be added by parents of permits and/or holders of the parent permit. A permit cannot add extensions to itself without validation from the parent permit, being validly sent from the parent permit, and/or being validly sent from the holder of the parent permit.

Preferably, the permit holder of the permit to be extended (optionally called the child permit for this example embodiment), creates a further public/private key pair for the new extension. Alternatively, the same public key is used as with the default/initial extension.

Preferably, a similar method as with creating a new child permit is used when adding an extension. In particular, the holder of the parent permit creates a similar permitContents structure, which is stringified and signed. The resulting body of the request may look like the following:

```
{
  “extend”: {
    “extendContents”: “<stringified extend object>”,
    “signature”: “<base64 signature over permitContents>”
  }
}
```

Note the structure is the same, except the “extend” name is used instead of “createChild”. A pre-stringified extend object optionally has a JSON structure and has the following format:

```
{
  “child”: “< child permit identifier >”,
  “extension”: “< extension name >”,
  “permitContents”:
  {
    “holderPubKey”: “<new extension’s public key (Base64
DER) >”,
    “permissionSet”: {
      “<namespaced permission name>”: “<permission
value>”,
      ...
    },
  }
}
```

Thus, the request preferably comprises a child permit identifier, an extension name, a public key for the new extension, and the permissions of the extension. Upon reception of the request, the parent permit conducts the same or similar validation steps as with creating a permit, including verifying the parent is still valid (not revoked and within the validity range), verifying the signature is correct and signed by the holder of the parent permit, that the namespace of the permissions does not exceed the parent permit’s namespace, and that the validity range is within the validity range of the parent permit.

Preferably, any one or more of the following further validations are conducted:

(A) the total levels the parent and/or child may have, (B) the maximum number of children a parent or child may have, and (C) the validity of the child has the same or a more narrow range as compared to the parent.

It should be noted that these validations are all to ensure that the new extension does not comprise any features that are broader or greater than the parent permit.

With respect to (A) above, if the child includes $.children.levels, then it must be less than the parents. With respect to (B) above, if the child includes a $.children.max it must fit within the envelope of the parent’s array (if any) with the first element removed. Noting that missing levels in the parent mean there is no limit. With respect to (C) above, the $.valid. {before, after} must be at least as narrow as the parent. There is a further validation that the child permit to be extended is actually a child of the parent. This is conducted by ensuring the child permit identifier is in the list of children stored on the parent permit’s data instance.

Next, a further add extension request is created and sent to the computing module associated with the child permit. Preferably, the child permit validates the received request in a similar manner as with the embodiment describing revoking a permit or extension. Preferably, the child permit validates that the request has been received from the parent permit. Preferably, the child validates that the request has been received from within the secure computing environment. Preferably, the child validates that it is not currently revoked.

Preferably, there is a check that a maximum number of extensions would not be exceeded with the addition of the new extension. Preferably, this is conducted by the child permit itself. Alternatively, this is conducted by the parent permit through use of the “Verify Permission” as discussed below under the same heading.

With the validations complete, the new extension is added to the child permit. Preferably according to the following statement: instanceState.extensions [extend]= clientInput.permitContents.

The child returns an appropriate success/fail message to the parent. The parent permit returns an appropriate success/fail message to the original sender of the request.

Validate Permission

In an embodiment there is provided a method for validating permissions. Preferably the method is provided as an API to any party. More preferably, the method is provided through the "query" endpoint as discussed above under the heading "Interactions with Permits".

The caller of the method preferably creates a request comprising a permit identifier and permission validation data. Optionally, the request comprises the extension of the permission to validate. Optionally, multiple permissions are validated.

The request is transmitted to the comprising the permission to be validated.

Preferably, a check is conducted to determine whether the permit has been revoked. If it has been revoked, the permit responds with an error message or invalid message indicating the permit and/or permission is invalid.

Preferably, the permission validation data comprises a name of the permission to be validated. More preferably, the permission validation data comprises an expression. Preferably, the permission validation data comprises an expression that when evaluated will operate on the value associated with the permissions name (the value of the name-value pair). Preferably, the expression is in the form of an expression language. Preferably, the expression language provides a permission searching pattern for the permit to conduct thereby validating the request against the appropriate permission(s).

Preferably, the expression language comprises features that enable the permit to query various features of permission's names and values. Various features of the expression language and examples are provided below. Preferably the expression is provided in a JSON format.

The permit evaluates the expression against its own permit data instance and therefore against the relevant permission(s) and then provides the result to the caller.

While a particular expression language is described below, a skilled person will appreciate that other expression languages may also be used such as regular expressions.

Optionally, the request comprises an indication as to the language the extension is in. Thus, the caller has expression flexibility in the language they would like to use.

Preferably, an expression is an object with a single property which defines the top-level operator. If this is a binary operator the operands are defined in an array of objects as the value of the operator property. These objects may be further binary operators, unary operators taking a single operand object, leaf terms taking a simple value, or just a plain value. An example expression comprising the expressions "not", "eq", "permission" is shown:

```
{
  not:
  {
    eq: [
      { permission: "com.acme.customer.type" },
      "wholesale"
    ]
  }
}
```

In plain English, this is an expression that will validate whether the permission "com.acme.customer.type" does not equal "wholesale".

Additionally, there exists expressions to determine whether the permit (or extension) has a particular permission. Basic terms of the expression language include "permission" and "has".

| Name | Parameter | Function |
|---|---|---|
| permission | string | Get the value of the given permission key |
| has | string | Returns true if the given permission key exists |

Preferably, the a number of comparison operators that can be used in an expression: equal to, not equal to, less than, less than or equal to, greater than, and greater than or equal to.

| Name | Function |
|---|---|
| eq | Returns true if all the operands are the same |
| ne | Returns true if any of the operands are different |
| gt | Returns true if the first operand is strictly greater than the second |
| lt | Returns true if the first operand is strictly less than the second |
| ge | Returns true if the first operand is greater than or equal to the second |
| le | Returns true if the first operand is less than or equal to the second |

Preferably, the following query operators are for use with string matching: contains, starts with, matches, and ends.

| Name | Function |
|---|---|
| contains | Returns true if the first operand contains the second |
| begins | Returns true if the first operand starts with the second (or is equal to it) |
| matches | Returns true if the first operand matches the second, the second being a JavaScript Regular Expression |

Preferably, a number unary operators can be used in an expression: not, minus, and length.

| Name | Function |
|---|---|
| not | Returns true if the operand is 'falsy', false otherwise |
| minus | Returns the negation of the operand (unary minus) |
| length | Returns the length of a string or array operand |

Note
'falsy' means false, 0 or empty string

Preferably, a number Boolean operators can be used in an expression; and, or.

| Name | Function |
|---|---|
| and | Returns true if all the operands are 'truthy' |
| or | Returns true if any of the operands are 'truthy' |

Note 'truthy' here means true, non-zero number or non-empty string

Preferably, the following mathematic query operators can be used to construct an expression: add, subtract, divide, modulus.

| Name | Function |
|---|---|
| add | Returns the sum of all the operands |
| subtract | Returns the successive subtraction of the second and subsequent operands from the first |
| multiply | Returns the product of all the operands |
| divide | Returns the successive division of the first operand by the second and subsequent |
| modulus | Returns the remainder of division of the first operand by the second |

Preferably, the expressions can be enhanced through use of set query operators: includes, and in.

| Name | Function |
|---|---|
| includes | Returns true if the first operand (an array) contains the second |
| in | Returns true if the second operand (an array) contains the first |

Note
the two are almost identical, only varying in the order of their operands.

Below are provided some example expressions and their associated plain English explanation of what they are checking.

{has: "isRoot"}

Validate that the permit comprises an "isRoot" element. Note this does not check the value (although in the present example, if there is a value, it will only ever be set to true.

{eq: [{permission: "com.example.foo"}, "bar"]}

Validate that the "com.example.foo" permission is equal to the string "bar".

{begins: [{permission: "com.acme.region"}, "Europe/"]}

Validate that the "com.acme.region" permission begins with "Europe/".

```
{
  or: [
    { in: [
      { permission: "com.acme.customer.level" },
      [ "gold", "silver" ]
      ]
    },
    { ge: [
      { permission: "com.acme.customer.points" },
      1000
      ]
    }
  ]
}
```

Validate that either "gold" or "silver" are present in the "com.acme.customer.level" permission, or that "com.acme-.customer.points" is greater than 1000. If either (or both) are true, the expression evaluates true because of the top-level "or".

Get Permission

In an embodiment, there is provided a method for getting a permission or permissions. Preferably the method is provided as an API to any party. More preferably, the method is provided through the "query" endpoint as discussed above under the heading "Interactions with Permits".

The caller of the method preferably creates a request comprising at least an identifier of the permit they are interested in. The request is transmitted to the relevant permit.

Where only interested in one permission, the caller of the method preferably creates a request comprising the name of the permission they are interested in.

Optionally, the request comprises an extension. Where there is an extension provided, the specific extension of interest is used.

Upon reception of the request, the permit responds with the contents of the permission if a particular permission is provided, or a list of all of the permissions if that is being requested.

Optionally, the method of getting all permissions associated with a permit (and/or extension of a permit) is not provided. By not providing such a method, the security of the system is increased as a third party cannot view everything the permit holder is allowed to do which may leak important information. This can also be described as only providing a service or method such that the caller needs to request specific permissions.

Check Validity

In an embodiment, there is provided a method for allowing external parties to check whether a given permit (and optionally its ancestors) is valid for a time. Preferably the method is provided as an API to any party. More preferably, the method is provided through the "query" endpoint as discussed above under the heading "Interactions with Permits".

The caller of the method preferably sends a request comprising a permit identifier. Optionally, the request comprises any one or more of the following:

- a time for which the validity will be checked against (if no time is supplied, then the current time is used),
- an ancestor identifier to determine how many ancestors to check the validity of (if any), and/or
- an extension to check the validity of.

Preferably, if an extension is provided, no ancestors are checked.

Preferably, the ancestor identifier is one of: no, parent, grandparent, great-grandparent, and root.

Preferably, the request is received by the computing module associated with the permit being checked.

Upon reception of the request, the permit will check that the provided time (which will be current time if no specific time is provided) is within the permit's validity range. The validity range is defined as being within the "$.valid.before" and "$.valid.after" special permissions as well as the "revoked" element of the permit instance data structure. Where an extension is provided in the request, the same fields are checked within the given extension if it exists. An error is returned if the extension does not exist.

If the request comprises an ancestor identifier other than "no", a further validity request is generated and sent to the parent permit. The parent permit is identified according to the parent element stored on each permit's data instance. The request will be constructed such that the appropriate levels of the permit tree are traversed. As each permit only knows about one level higher, each parent transmits a yet another further validity request thus traversing the relevant parts of the tree permit structure. The permit having its validity checked receives, from its parent, an indication as to the validity of all of the parent permits as requested.

The permit will respond with an indication as to the validity of permit. The response will also comprise indications as to the validity of any ancestors requested.

Verify Signature

In an embodiment, there is provided a method for verifying that some message was signed by the holder of a given permit. Preferably, the method is provided as an API to any party. More preferably, the method is provided through the "query" endpoint as discussed above under the heading "Interactions with Permits".

The caller of a method preferably sends a request comprising the message upon which the signature was applied, the signature itself, and an identifier of the permit. Optionally the identifier of the permit is comprised in the header and/or address of the request and the signature and the message are provided in the body.

Optionally, an extension string is also provided. When an extension string is present in the request, the holderPubKey of the particular extension is used as opposed to the "default" extension.

The receiver of the request locates the appropriate holderPubKey and then verifies that the signature was signed by the holder of the associated private key (which only the holder of the permit should have). Locating the appropriate holderPubKey preferably requires obtaining the correct permit data instance and then the appropriate extension (if used, otherwise the "default" extension is used). Preferably the request is received at the permit computing module associated with the identifier (and therefore the appropriate permit data instance) through use of an address comprising the permit identifier as is described above under the "Interactions with Permits" heading.

Preferably, verifying the signature comprises hashing the message, decrypting the signature using the holderPubKey to be verified, and comparing the two. If the two are the same, then only the private key associated with the holderPubKey could have been used to generate the signature. More preferably, the signing and therefore verification of the signature uses ECDSA signatures and the ECDSA signing algorithm as set out in RFC 6979.

The result of the verification is provided back to the caller in a response. Preferably, the response is also signed to prove that the response could only have originated from the specified permit computing module. More preferably, the signature is provided in the header of the response and the verification result is provided in the body.

Sessions

Optionally, in an embodiment, interactions with permits, such as the ones listed above under the "Interactions with Permits" heading are conducted after a session authorisation has occurred.

The permit holder may request a session key/token by calling the . . . /session endpoint (or . . . /send or . . . /query). An example session request header may comprise the following:

POST/api/v1/process Instances/{Permit-instanceId}/session

When such a request is made, the permit will be invoked with the appropriate endpoint provided to them (e.g. session). The permit should receive a request comprising the following signed instructions:

```
"getSession": {
  "instruction": {
    "timestamp": "2021-04-08T18:12:00Z",
    "period": 3600, //seconds
    "parent": { "extension": "auditor" }
    "extension": "iPhone" //optional
  },
  "signature": "<signature over instruction>"
}
```

Preferably, the "instruction" object is stringified such that the signature is applied to a known data structure as discussed herein.

The timestamp is preferably within approximately one minute of the current time to prevent replay attacks and the period is the request length of the session in seconds. The permit will validate the signature (using the appropriate extension if provided) and may set the session permit to any value less than or equal to the period of the request.

If parent is present, the request is coming from the holder of the parent permit rather than the permit holder. In this case, the signature must be checked against the parent's public key. Preferably, this check is conducted using the "Verify Signature" method as discussed above under the "Verify Signature" heading.

When the parent is present in the request, any extensions are ignored.

Optionally, a successful response could look like:

```
{
  "result": "ok",
  "msg": "Session approved",
  "maxSessionPeriod": 3600, // seconds
  "instanceId": executorContext.instanceId
};
```

If the request is rejected by, for example a bad signature, the response may look like:

```
{
  "result": "failed",
  "msg": "Bad signature",
  "instanceId": executorContext.instanceId
};
```

If the session period is less than a minimum value or greater than a maximum value (as determined by permit config and/or the secure processing environment's config- say 20 seconds to 1 week), no session key will be created.

If the session period is in an acceptable range, a session key is created and returned in the header of the response.

If the request is signed correctly but the period is too short, the period may be increased to the minimum.

Security

Optionally, in an embodiment, there is provided a further security endpoint.

It may be possible that an attacker wishes to produce a fake permit to fool an observer. One way to mitigate against this attack is to inspect the header of any responses received from the permit. Every genuine permit will have the same well-known process identifier as discussed under the "Example System Overview". This process identifier is provided in the header of every message.

If further security is required, cryptographic evidence can be provided in the response also. Thus, a permit's public key is available from the/security endpoint which enables any responses signed by the permit to be validated.

An example request may comprise the following header:

GET/api/v1/process Instances/{instanceId}/security

The response to such an API request optionally has the following form:

```
{
  "instanceId": "<instanceId>",
  "instancePubKey": "<instancePubKey",
  "processId": "<processId>"
}
```

Thus, with the public key, a third party can validate a signature using their own device.

Computing Modules

Figure 6:
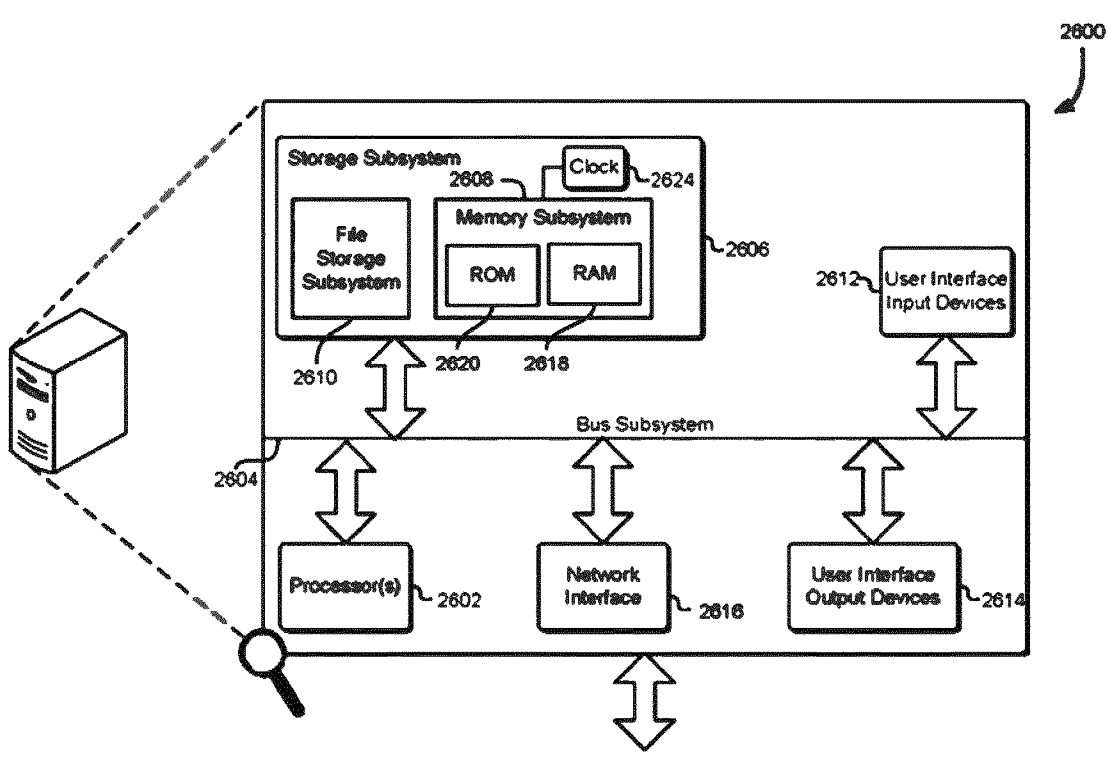
FIG. 6 is a schematic diagram, illustrating a computing environment in which various aspects and embodiments of the present disclosure can be implemented.

Turning now to FIG. 6, there is provided an illustrative, simplified block diagram of a computing device 2600 that may be used to practice at least one embodiment of the present disclosure. In various embodiments, the computing device 2600 may be used to implement any of the systems or methods illustrated and described above. For example, the computing device 2600 may be configured to operate the secure computing environment 108 and host a number of computing modules 102, 104, 106. The computing device 2600 may be configured to be a permit holding device that is associated with a permit holder. The computing device 2600 may be configured to be computing module 102, 104, 106 itself. Thus, computing device 2600 may be a portable computing device, a personal computer, a server, a collection of servers, or any electronic computing device.

Where the computing device 2600 is providing the secure computing environment 108, or providing part of the secure computing environment, it also provides systems and methods for computing modules 102, 104 operating internally to communicate with each other. Optionally, this is provided through its own internal DNS and routing systems. Optionally this is provided through IPC calls.

As shown in FIG. 6, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 6 is intended only as a specific example for purposes of illustrating the preferred embodiment of the device. Many other configurations having more or fewer components than the system depicted in FIG. 6 are possible.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

In an implementation, the modules described herein can be implemented as computing processes such as processes running on a monolithic server, microservices, lambda functions. Access to the computing modules can be provided through use of an API as described herein. These modules optionally comprise sub-modules configured to receive and transmit data to and from other computing modules and/or computing devices. Preferably, the modules comprise a memory for temporary and/or permanent storage of data. In particular, the memory is configured to store (for subsequent access) the permit's own permit data instance in a permanent manner.

A "hardware component" or "hardware module" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" or "hardware module" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "determining", "providing", "calculating", "computing," "identifying", "combining", "establishing", "sending", "receiving", "storing", "estimating", "checking", "obtaining" or the like, refer to the actions and processes of a process, function, microservice, computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

The singular reference of an element does not exclude the plural reference of such elements and vice-versa.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method for validating a permit, comprising the steps:

receiving, from a client device, a request to validate an expression associated with at least one permission of the permit, the request comprising a permit identifier that identifies the permit and data indicative of the expression associated with the at least one permission;

obtaining permit data based on the permit identifier, wherein the permit data comprises data indicative of the at least one permission, wherein the at least one permission provides an indication of one or more actions a holder of the first permit can take and/or what a holder of the permit is allowed to do;

validating the permit, wherein the validation comprises at least:

i) determining whether the permit has been revoked;

ii) determining whether the expression associated with the at least one permission of the permit is greater than or equal to a configured value; and iii) generating a validation result based on the determination of whether the permit has been revoked and the determination of whether the expression is greater than or equal to the configured value, wherein the validation result indicates that the permit is valid only where the permit has not been revoked and the expression is greater than or equal to the configured value; and transmitting data indicative of the received request for inclusion on an immutable and publicly accessible blockchain, wherein the data indicative of the request is also configured to provide an indication of the validation result.

2. The computer-implemented method according to claim 1, further comprising the step of determining whether the permit comprises a permission that matches the data indicative of the further permission.

3. The computer-implemented method according to claim 2, further comprising the step of returning a result of the determination of a matching permission to the sender.

4. The computer-implemented method according to claim 1, further comprising the step of continuing processing the request based on a determination of whether the permit has been revoked.

5. The computer-implemented method according to claim 4, wherein step of determining whether the first permit has been revoked comprises checking a revoked field in the first permit data.

6. The computer-implemented method according to claim 5, wherein step of determining whether the permit has been revoked comprises checking whether a first time stored in the revoked field is earlier than a current time.

7. The computer-implemented method according to claim 1, wherein the expression comprises data configured to interrogate features of the permissions associated with the permit.

8. The computer-implemented method according to claim 1, further comprising the step of evaluating the expression.

9. The computer-implemented method according to claim 1, further comprising the step of returning the result of the evaluation of the expression to the sender of the request.

10. The computer-implemented method according to claim 1, comprising:

receiving a further request to validate a signature signed by a holder of the permit.

11. The computer-implemented method according to claim 10, wherein the sender of the request and the further request are the same.

12. The computer-implemented method according to claim 1, wherein data indicative of the at least one permission is an object comprising at least one name-value pair.

13. The computer-implemented method according to claim 1, wherein the request is received via an API that is only provided to computing modules belonging to a secure computing environment.

14. The computer-implemented method according to claim 1, wherein the permit is part of a hierarchy of permits.

15. The computer-implemented method according to claim 1, wherein the permit data comprises at least one of:

an indication as to whether further permits may be generated that are children of the permit;

at least one namespace, wherein each namespace defines part of a permission a child of the permit can have;

an indication as to a maximum depth of descendants that the permit can have;

a maximum number of children permits that the permit can have;

an array to indicate a maximum number of descendant permits that the first permit can have at different depths; or a time that indicates when the permit is valid from or until.

16. The computer-implemented method according to claim 1, wherein the permit identifier obliviates the identity of the holder of the permit or is a pseudo-randomly generated string of characters.

17. A non-transitory computer-readable storage medium comprising computer program code instructions, being executable by a computer, to conduct the computer-implemented method as claimed in claim 1.

* * * * *